United States Patent
Nihei

(10) Patent No.: US 8,356,448 B2
(45) Date of Patent: Jan. 22, 2013

(54) MOVABLE TENSEGRITY STRUCTURE

(75) Inventor: Kazuhiro Nihei, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 12/866,112

(22) PCT Filed: Jan. 13, 2009

(86) PCT No.: PCT/JP2009/050291
§ 371 (c)(1),
(2), (4) Date: Aug. 4, 2010

(87) PCT Pub. No.: WO2009/101828
PCT Pub. Date: Aug. 20, 2009

(65) Prior Publication Data
US 2011/0005160 A1   Jan. 13, 2011

(30) Foreign Application Priority Data
Feb. 13, 2008   (JP) ................. 2008-031604

(51) Int. Cl.
*E04H 9/00* (2006.01)
*E04H 14/00* (2006.01)
*E04H 12/18* (2006.01)
*E04C 5/08* (2006.01)

(52) U.S. Cl. ............... 52/223.8; 52/1; 52/645; 52/646; 52/637

(58) Field of Classification Search ............... 52/223.8, 52/223.1, 223.2, 223.3, 645, 646, 637, 638
See application file for complete search history.

(56) References Cited

U.S. PATENT DOCUMENTS

| | | | |
|---|---|---|---|
| 3,063,521 A * | 11/1962 | Fuller | 52/646 |
| 3,771,274 A | 11/1973 | Vaughan | |
| 4,557,097 A * | 12/1985 | Mikulas et al. | 52/646 |
| 5,448,867 A * | 9/1995 | Wilson | 52/641 |
| 5,642,590 A | 7/1997 | Skelton | |
| 5,727,391 A * | 3/1998 | Hayward et al. | 60/528 |
| 6,441,801 B1 * | 8/2002 | Knight et al. | 343/915 |
| 6,748,962 B2 * | 6/2004 | Miller | 135/130 |
| 7,013,608 B2 * | 3/2006 | Newland | 52/146 |
| 7,533,681 B2 * | 5/2009 | Miller | 135/130 |
| 7,578,307 B2 * | 8/2009 | Ung et al. | 135/128 |

(Continued)

FOREIGN PATENT DOCUMENTS

| | | |
|---|---|---|
| JP | 2-58646 A | 2/1990 |
| JP | 09-166286 A | 6/1997 |

(Continued)

OTHER PUBLICATIONS

International Search Report dated Mar. 17, 2009 issued in International Appln. No. PCT/JP2009/050291.

*Primary Examiner* — Mark Wendell
(74) *Attorney, Agent, or Firm* — Holtz, Holtz, Goodman & Chick, PC

(57) ABSTRACT

Provided is a movable tensegrity structure capable of performing bending operation, twisting operation, contracting operation, etc. by itself. The movable tensegrity structures (**1, 1\*, 10) is constituted by combining a plurality of rigid members (2, 11) and tension members (3, 12) for connecting the end points (E, F) of the rigid members (2, 11), respectively. The tensegrity structure is characterized in that all or a part of the plurality of tension members (3, 12**) is formed of a contraction-controllable member.

17 Claims, 14 Drawing Sheets

U.S. PATENT DOCUMENTS

| | | | |
|---|---|---|---|
| 7,900,646 B2 * | 3/2011 | Miller | 135/130 |
| 7,963,084 B2 * | 6/2011 | Merrifield et al. | 52/646 |
| 2006/0102088 A1 * | 5/2006 | Wroldsen et al. | 119/223 |
| 2011/0218396 A1 * | 9/2011 | Williams et al. | 600/40 |
| 2012/0031830 A1 * | 2/2012 | Edwards et al. | 210/244 |

FOREIGN PATENT DOCUMENTS

| | | |
|---|---|---|
| JP | 2000-5225 A | 1/2000 |
| JP | 2002-70156 A | 3/2002 |
| JP | 2002-132432 A | 5/2002 |

* cited by examiner

MOVABLE TENSEGRITY STRUCTURE

This application is a U.S. National Phase Application under 35 USC 371 of International Application PCT/JP2009/050291 filed Jan. 13, 2009.

TECHNICAL FIELD

The present invention relates to a tensegrity structure, particularly to a movable tensegrity structure.

BACKGROUND ART

In recent years, there has been development of various forms of tensegrity structures having been invented by Kenneth Snelson and named by R. Buckminstar Fuller (see Patent Literatures 1 and 2), and attempts have been made for application of the tensegrity structure in various industrial fields (see Patent Literatures 3 and 4).

The tensegrity structure is normally made up of a combination of a rigid member (compression member) capable of withstanding compression, and a cable and the like (tension member) capable of withstanding tension. In recent years, the tensegrity structure also may include the structure wherein an elastic member such as a rubber and spring capable of being elongated is used as a tension member, instead of a cable.

Patent Literature 1: Japanese Registered Patent No. 2524202

Patent Literature 2: Japanese Unexamined Patent Application Publication No. H09-166286

Patent Literature 3: Japanese Unexamined Patent Application Publication No. 2000-5225

Patent Literature 4: Japanese Unexamined Patent Application Publication No. 2002-132432

DISCLOSURE OF THE INVENTION

Object of the Invention

The tensegrity structure is characterized in that a rigid member appears to be floated when a thin linear member is used as a tension material. This is the reason why this structure has often been used in the field of architectural and artistic fields. The tensegrity structure can be designed in a light-weight configuration. Moreover, when subjected to external force, the tensegrity structure is flexibly deformed, but comes back to the original shape when the external force has been removed. Therefore, study efforts have been made to find out applications in other fields wherein this characteristic can be effectively used.

The present inventors have been making research efforts to invent a so-called movable tensegrity structure which can deform itself, by improving the conventional tensegrity structure which cannot deform itself although it can be deformed flexibly when subjected to external force. In the process of research efforts, the present inventors have obtained various forms of new knowledge. The movable tensegrity structure capable of operation by itself has been found out to be capable of performing complicated operations such as bending operation, twisting operation about a predetermined axis and contracting operation in a predetermined direction by itself when an appropriate configuration is adopted.

Thus, the movable tensegrity structure capable of performing bending operation, twisting operation, and contracting operation by itself can be used in various forms of technological fields including a robot arm in a production line, a free-traveling robot moving as an inchworm and a human movement assist device used to increase the human muscle strength (also called a power assist device).

In view of the foregoing, it is an object of the present invention to provide a movable tensegrity structure capable of performing bending operation, twisting operation and contracting operation by itself.

Means for Solving the Object

To achieve the above object, a movable tensegrity structure of claim 1 is configured with a combination of a plurality of rigid members and a plurality of tension members connecting ends of the respective rigid members, wherein a whole or a part of the tension members are made up of a contraction-controllable member.

An invention of claim 2 is the movable tensegrity structure of claim 1, wherein each of the rigid members is not surrounded by three members which are two other of the rigid members and the tension member connecting ends of the two other of the rigid members, and the tension member is made up of a contraction-controllable member.

An invention of claim 3 is the movable tensegrity structure of claim 1, wherein when at least three members which are two of the rigid members and the tension member connecting ends of the two rigid members do not surround other of the rigid members, the tension member is made up of the contraction-controllable member.

An invention of claim 4 is the movable tensegrity structure of any one of claims 1 to 3, wherein layers each of which is made up of a combination of a predetermined number of the rigid members are stacked in an axis direction.

An invention of claim 5 is the movable tensegrity structure of claim 4, wherein the predetermined number of the rigid members are combined to make the layers such that an internal space is made around the axis.

An invention of claim 6 is the movable tensegrity structure of claim 4 or 5, wherein the predetermined number of rigid members are arranged so as to make a mirror image of an arrangement of the predetermined number of rigid members belonging to a layer which is directly adjacent to the layer to which the predetermined number of rigid members belong.

An invention of claim 7 is the movable tensegrity structure of any one of claims 4 to 6, wherein the tension member connects at least ends of the rigid members belonging to the same layer.

An invention of claim 8 is the movable tensegrity structure of any one of claims 4 to 7, wherein the tension member connects an end of the rigid member belonging to one of the layers and an end of the rigid member belonging to the layer which is adjacent to the layer which is adjacent to the one of the layers.

An invention of claim 9 is the movable tensegrity structure of claim 7 or 8, wherein the tension member connects ends of the rigid members each of which exists in a boundary portion of adjacent two of the layers.

An invention of claim 10 is the movable tensegrity structure of any one of claims 7 to 9, wherein the tension member is made up of a contraction-controllable member.

An invention of claim 11 is the movable tensegrity structure of any one of claims 4 to 10, wherein the tension members made up of the contraction-controllable member are arranged to be inclined with respect to the axis.

An invention of claim 12 is the movable tensegrity structure of any one of claims 1 to 11, wherein the contraction-controllable member is made up of polymer artificial muscle.

An invention of claim 13 is the movable tensegrity structure of any one of claims 4 to 12, wherein the tensegrity structure is configured so that the axis is bent by contracting the contraction-controllable member thereby contracting apart of one of the layers in the axis direction.

An invention of claim 14 is the movable tensegrity structure of any one of claims 4 to 13, wherein the tensegrity structure is configured so that the tensegrity structure is twisted about the axis by contracting the contraction-controllable member thereby contracting a whole of one of the layers in the axis direction.

An invention of claim 15 is the movable tensegrity structure of any one of claims 4 to 13, wherein the tensegrity structure is configured so that the tensegrity structure is contracted in the axis direction by contracting the contraction-controllable member thereby contracting the layers in the axis direction.

EFFECTS OF THE INVENTION

According to the invention of claim 1, a whole or a part of the plurality of tension members connecting the ends of the rigid members constituting the tensegrity structure is made of a contraction-controllable member (artificial muscle). Therefore, the tensegrity structure can be movable. In addition, by contracting the tension member made of a construction-controllable member, the tensegrity structure is allowed to bend, twist, and contract.

According to the invention of claim 2 or 3, in addition to the advantage of claim 1, since the rigid member is not surrounded by the three members which are the other rigid members and the tension member connecting the ends of the other two rigid members, and this tension member made of contraction-controllable member (artificial muscle), this rigid member works as a so called fulcrum for the other two rigid members so as to prevent other portion of the tensegrity structure from contracting when the tension member made of a contraction-controllable member contracts.

When the contraction of the tension member made of contraction-controllable member causes plural portions to contract, the movable tensegrity structure has to be controlled in a complex manner. However, if the configuration is made so that when the single tension member made of a contraction-controlled member contracts, only the part of the concerned tension member is contracted as describe above, the movable tensegrity structure is simply controlled with a simple control structure.

According to the invention of claim 4, when the tensegrity structure is configured with layers stacked in the axis direction, each of which layers is configured with a combination of a predetermined number of rigid members, the contraction of the tension member made of contraction-controllable member causes only the portion of the concerned tension member to contract, thereby easily realizing bending operation. In addition, in the above described tensegrity structure where contraction of a whole or a part of the tension members are made of a contraction-controllable member, the bending operation, the twisting operation, and the contracting operation are easily and steadily conducted, thereby steadily providing the aforementioned advantages.

According to the invention of claim 5, in addition to the advantages of the aforementioned inventions, since the rigid members and the like constituting the layer is made smaller and thinner and the number of layers is increased, thereby shortening the thickness, in the axis direction, of the layer, the movable tensegrity structure has a thin cylinder wall, and smoother and more flexible bending, twisting, and contracting operations.

Further, when a human and the like put their body in the internal space of the movable tensegrity structure to wear the movable tensegrity structure, the movable tensegrity structure can be used as a movement assist device (a reinforcing cloth, a power assist device) for assisting muscle force of a human body.

According to the invention of claim 6, in addition to the advantages of the aforementioned inventions, the arrangement of the predetermined number of rigid members belonging to the layers are in mirror image relationships with each other between the layers, it is easy to stack in the axis direction the layers each constituted by the predetermined number of rigid members so as to configure the tensegrity structure. In addition, since it is possible for one layer and another layer made of rigid members having a mirror image arrangement with respect to the one layer to have reversed twist directions, it is possible to cause the tensegrity structure made of layers stacked in the axis direction to conduct so called twisting operation in both right and left directions.

According to the invention of claims 7, 8, and 9, in addition to the advantages of the aforementioned inventions, the movable tensegrity structure is configured, in stable state, with layers stacked in the axis direction since the tension members connect: the ends of the rigid members belonging to the same layer; the end of a rigid member belonging to one layer and the end of a rigid member belonging to another layer; or the ends of the rigid layers in the boundary portion between adjacent layers.

According to the invention of claim 10, it is possible to easily and adequately cause the movable tensegrity structure configured with layers stacked in the axis direction to conduct bending operation, twisting operation, and contracting operation, since the tension members of claims 7 to 9 are made of a contraction-controllable member.

According to the invention of claim 11, in addition to the advantages of the aforementioned inventions, it is possible to easily cause the movable tensegrity structure configured with layers stacked in the axis direction to conduct bending operation, twisting operation, and contracting operation thereby demonstrating the aforementioned inventions, since the tension members made of a contraction-controllable member is arranged to be inclined with respect to the axis of the movable tensegrity structure.

According to the invention of claim 12, since the contraction-controllable member is made of polymer artificial muscle, contraction is easily controlled by supplying current to the artificial muscle and the artificial muscle contracts quickly, as a result, the advantages of the aforementioned inventions adequately demonstrated, and the bending, twisting, and contracting operations are conducted at a high speed.

According to the invention of claims 13, 14, and 15, it is possible to bend the axis of the tensegrity structure, twist it about the axis, or contract it in the axis direction, and the control structure of those operations is simpler, since the contraction-controllable member is contracted to contract a whole or a part of one layer thereby causing bending operation, twisting operation, and contracting operation, as a result, the advantages of the aforementioned inventions are adequately demonstrated.

BRIEF DESCRIPTION OF TILE DRAWINGS

FIG. 3A is a front view showing the rigid members belonging to the layer La, while

FIG. 5A is a front view showing the rigid members of the movable tensegrity structure of FIG. 1 and artificial muscle, while

FIG. 6A is a front view showing an example of the variation of FIG. 5A, while

FIG. 12A is a front view showing the structure of a movable tensegrity structure as a second embodiment, while

Figure 1:
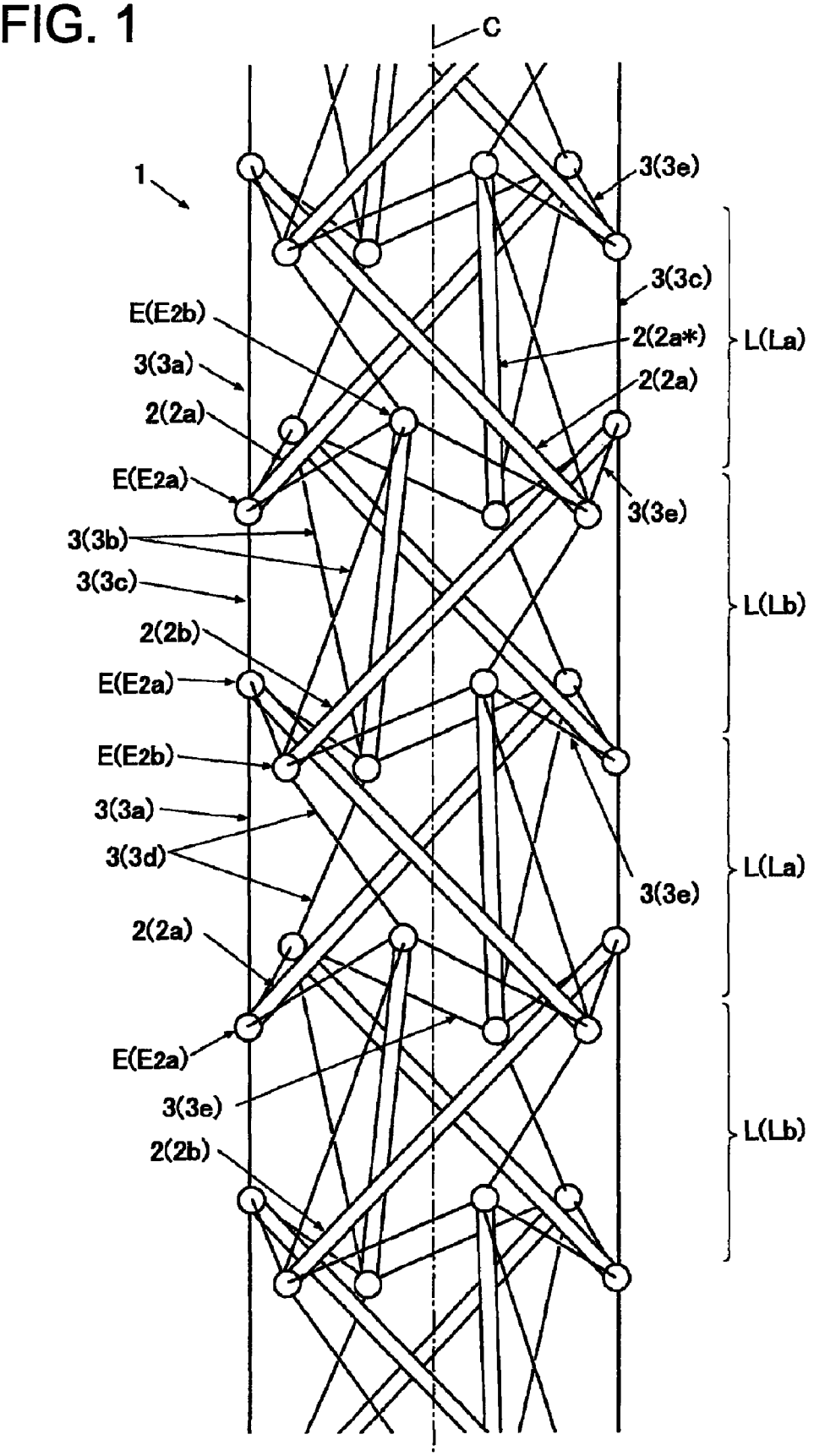
FIG. 1 is a front view showing the structure of a movable tensegrity structure as a first embodiment.

DESCRIPTION OF THE NUMERALS 1, 1* Movable tensegrity structure
2, 2a, 2b Rigid member
3, 3a, 3b, 3c, 3d, 3e Tension member
10 Movable tensegrity structure
11, 11a, 11b: Rigid member
12, 12a, 12b, 12e, 12f Tension member
C: Axis
D: Axis
E, E2a, E2b: End point
F, F11a, F11b: Endpoint
L, La, Lb: Layer
M, Ma, Mb: Layer
S: Internal space

BEST MODE FOR CARRYING OUT THE INVENTION

Referring to the drawings, the following describes embodiments of a movable tensegrity structure according to the present invention:

In the following description of the present invention, the rigid body withstanding the compression constituting the tensegrity structure will be referred to as a rigid member, and the member giving a force of resisting the force that separates the end points of the different rigid members will be referred to as a tension member. This does not exclude the cases wherein such an elastic material as a rubber or spring is used as the tension member.

1. First Embodiment 1-1. Configuration of Movable Tensegrity Structure

Figure 4:
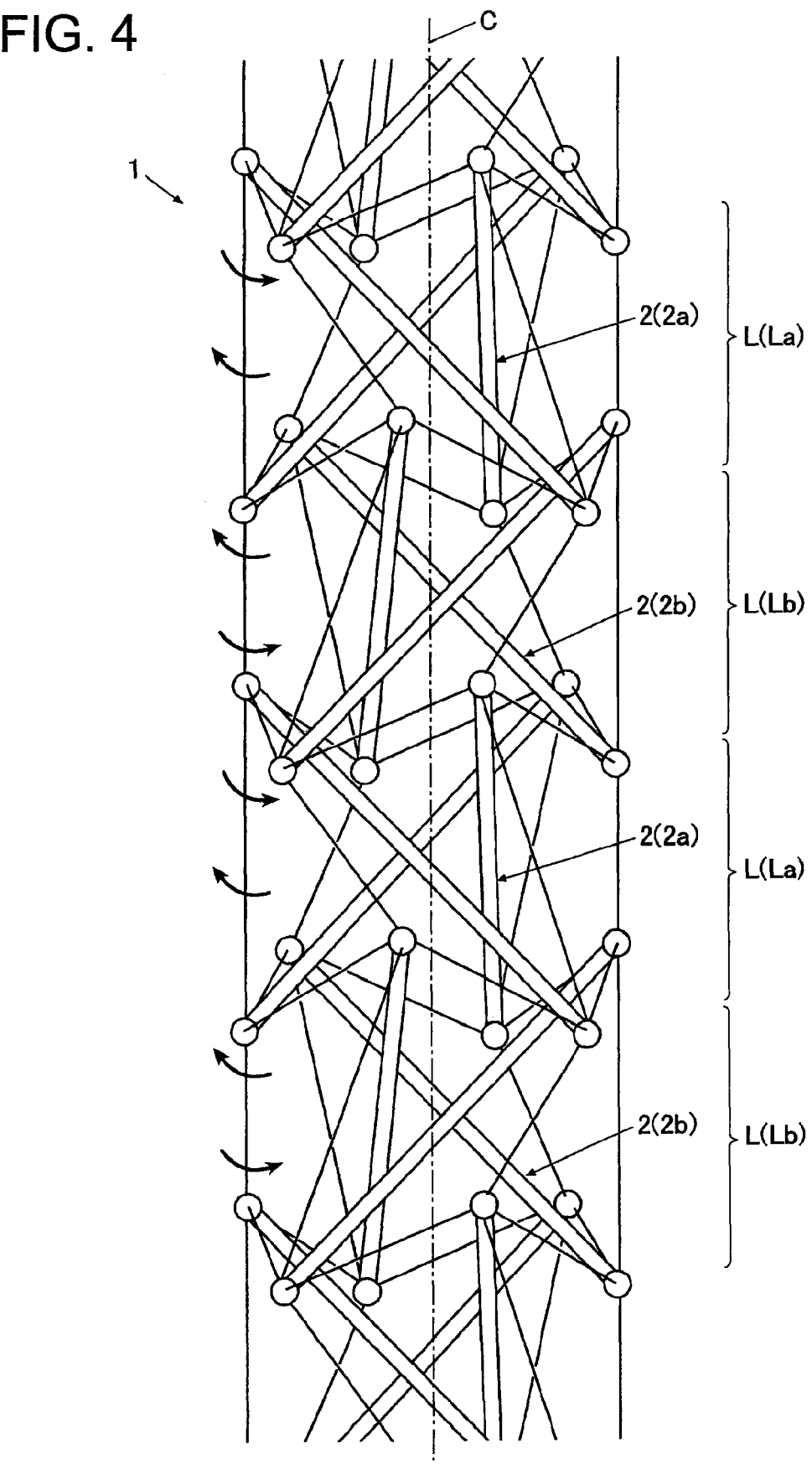
FIG. 4 is a front view showing the twisting direction in each layer of the movable tensegrity structure of FIG. 1.

FIG. 1 shows the simplest configuration of the movable tensegrity structure 1 as a first embodiment of the present invention. As shown in FIG. 4, the movable tensegrity structure 1 is formed of a combination of a plurality of rigid members 2 and a plurality of tension members 3 connecting the end points E of the rigid members 2.

[1-1-1. Rigid Member]

Figure 2:
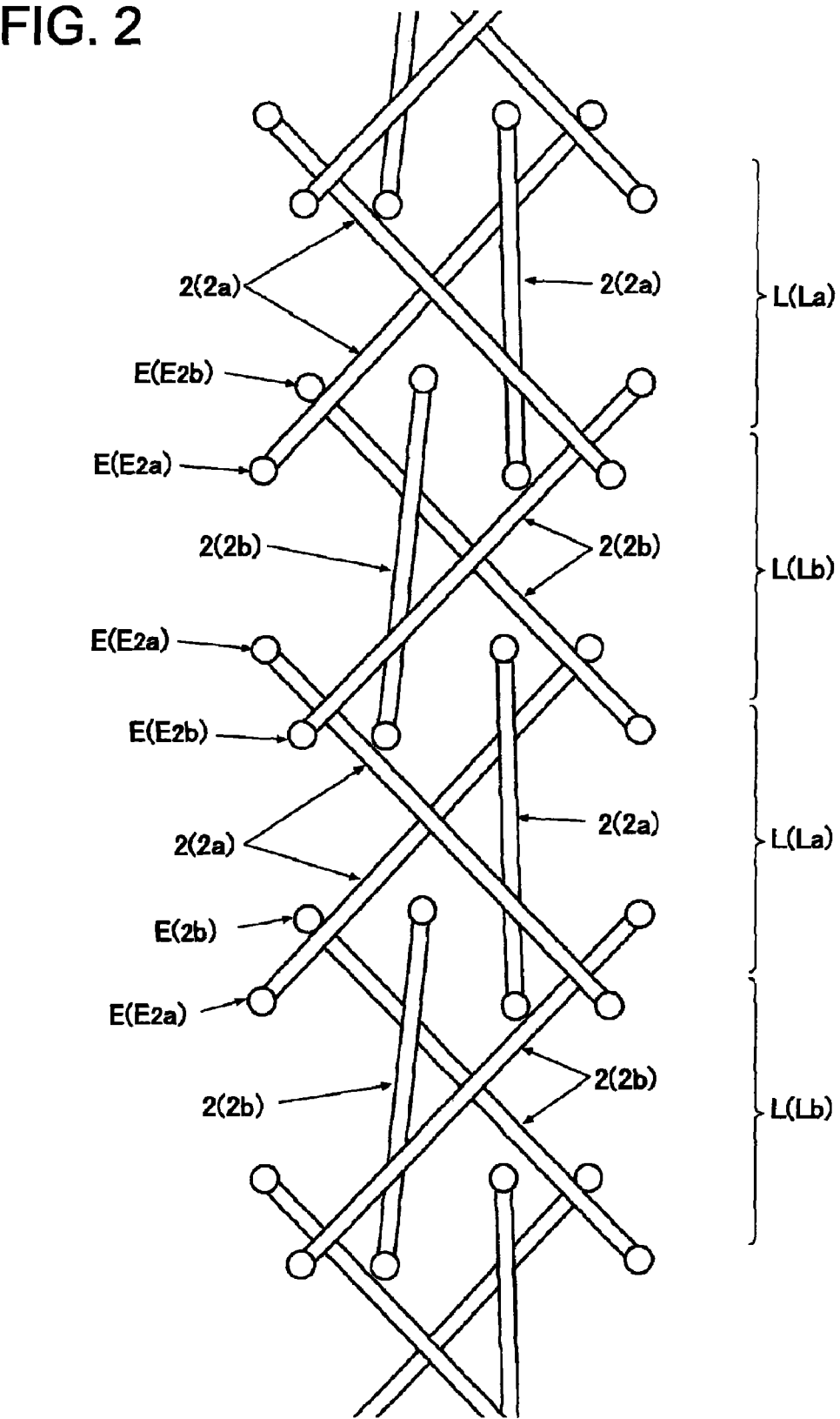
FIG. 2 is a diagram representing only the rigid members of the movable tensegrity structure of FIG. 1.

In the first place, the arrangement of the rigid members 2 will be described. The rigid members 2 are connected with each other through the tension members 3, instead of being connected directly with each other. In this embodiment, the rigid member 2 is made of rod-like members having the same length and diameter, as shown in FIG. 1, and FIG. 2 wherein only the rigid members 2 are shown.

In this embodiment, one layer L is formed of three rigid members 2 as a combination. The movable tensegrity structure 1 is configured in such a way that each of the layers L is stacked along an axis C. Each of the rigid members 2 belongs to any of the layers L, never belonging to other layer L by moving beyond the layer L to which the rigid member belongs. To be more specific, a rigid member 2 forming one layer L does not become other rigid member 2 that constitutes other layer L.

Figure 12A:
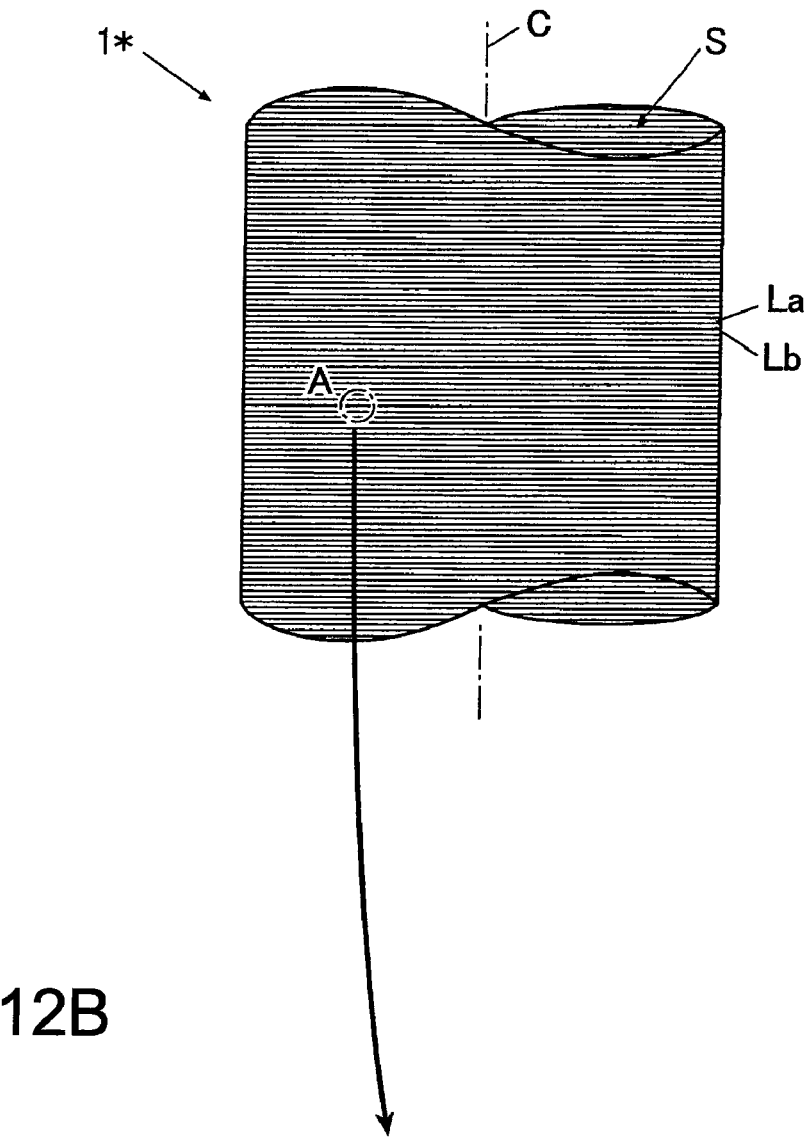
Figure 12B:
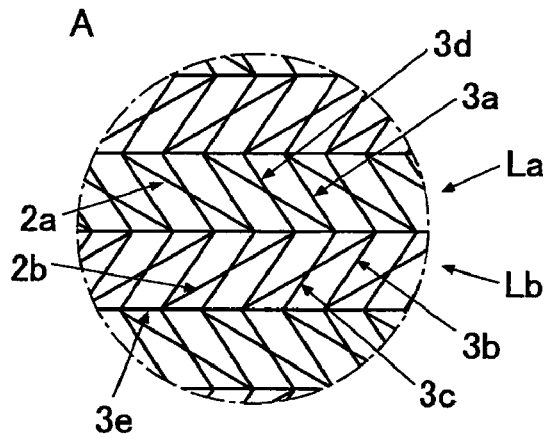
FIG. 12B is an enlarged view showing the circle A of FIG. 12A.
Figure 13:
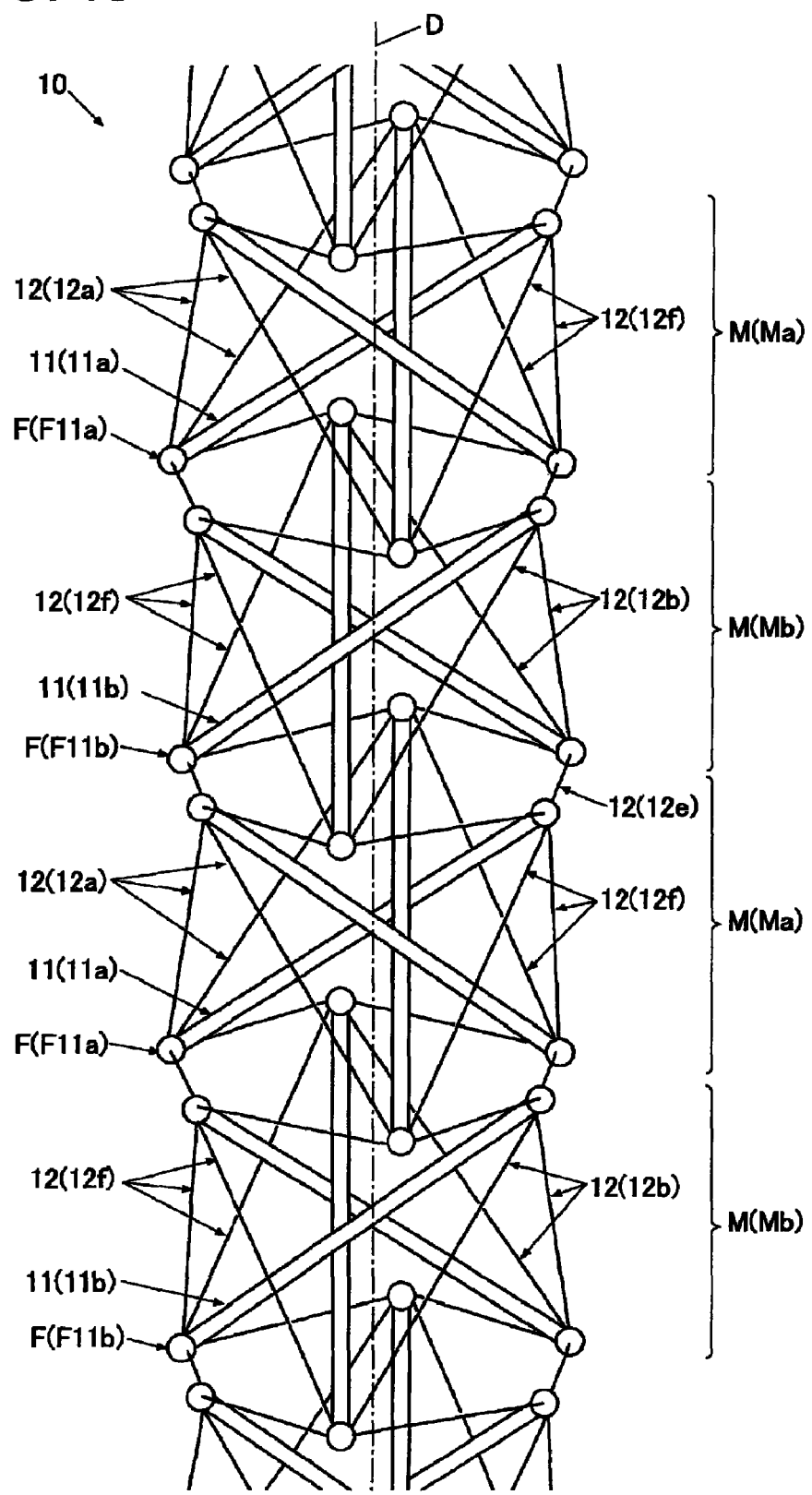
FIG. 13 is a front view showing the structure of a movable tensegrity structure as a third embodiment.

In this embodiment and the following embodiments, for a simplify description of the arrangement of the members, the positional relationship in the vertical or horizontal direction among the members of the movable tensegrity structure will be expressed in terms of the positional relationship in the vertical or horizontal direction shown in FIGS. 1, 12 and 13. To put it more specifically, even when a certain member is described as being located above a different member in this Specification, if the axis C extends in the horizontal direction, this member is considered to be located in the lateral direction with respect to the aforementioned different member in the movable tensegrity structure 1.

Figure 3A:
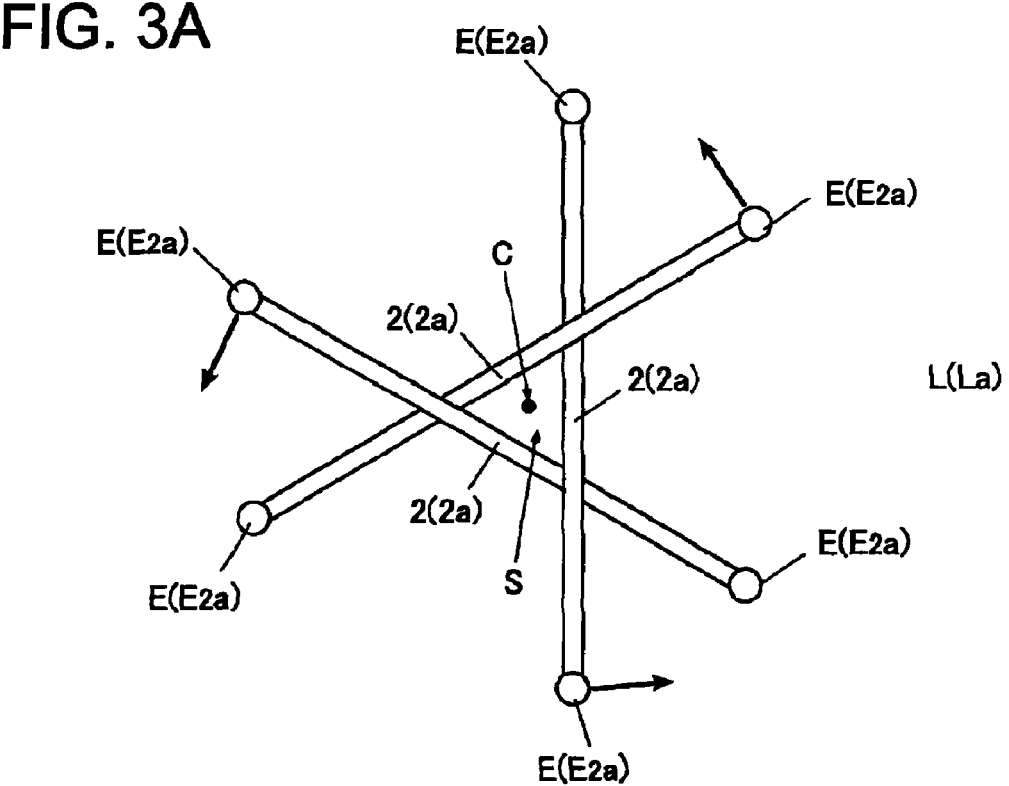
Figure 3B:
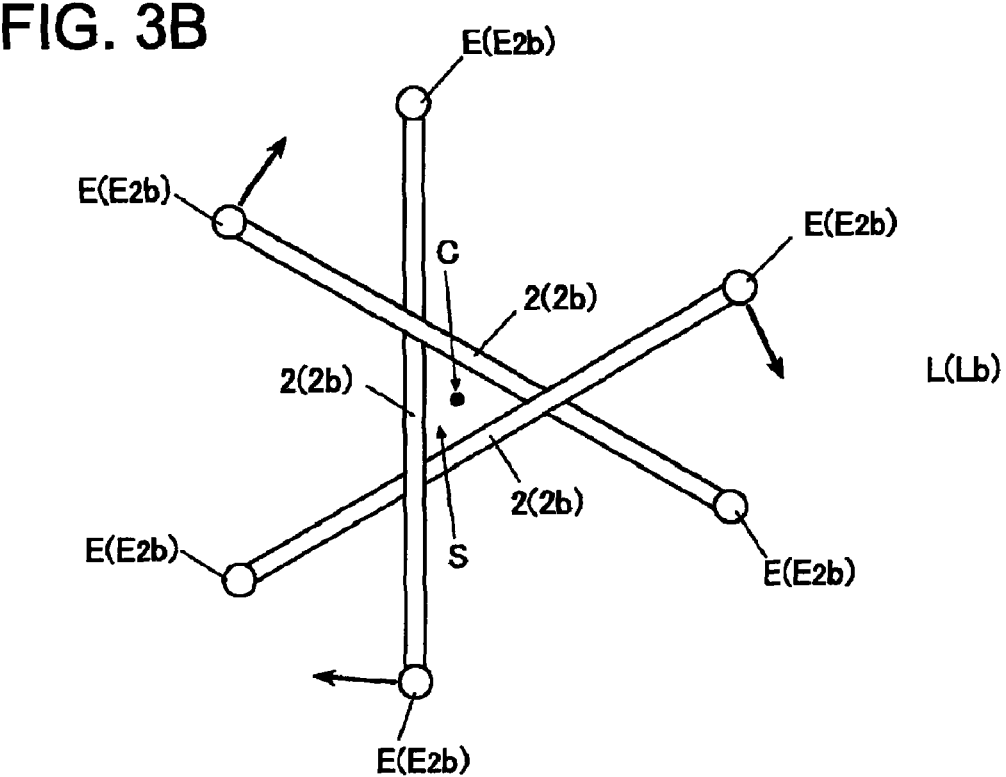
FIG. 3B is a front view showing the rigid members belonging to the layer Lb.

Assume that two adjacent layers are each layers La and Lb, and the rigid members 2 belonging to the layers La and Lb are rigid members 2a and 2b, respectively. In this case, the rigid members 2a and 2b of the layers La and Lb are shown in the plan view of FIGS. 3A and 3B. As shown in FIGS. 3A and 3B, the three rigid members 2 belonging to each layer L are arranged in such a twisted configuration that each of the rigid members 2 travels above one of the other two rigid members 2 and below the remaining one of the rigid members 2.

In this embodiment, the three rigid members 2a belonging to layer La and the three rigid members 2b belonging to layer Lb are considered to be in a mirror image relationship to each other.

To be more specific, the layer La of FIG. 3A is considered in terms of a system wherein the position of the end point E2a on the lower side of each rigid member 2a is fixed. When the end point E2a on the upper side is rotated in the direction shown by an arrow, each of the rigid members 2a can be moved freely in the rotary direction. However, if an attempt is made to move each of the rigid members 2a in the direction opposite to the arrow of the drawing, the rigid members 2a collide with each other and fail to move.

In contrast, similarly, the layer Lb of FIG. 3B is considered in terms of a system wherein the position of the end point E2b on the lower side of each rigid member 2b is fixed. When the end point E2a on the upper side is rotated in the direction shown by an arrow, each of the rigid members 2b can be moved freely in the rotary direction. However, if an attempt is made to move each of the rigid members 2b in the direction opposite to the arrow of the drawing, the rigid members 2b collide with each other and fail to move.

Thus, in this embodiment, the three rigid members 2a belonging to layer La and the three rigid members 2b belonging to layer Lb are arranged to form mirror images of each other, so the directions in which each of the rigid members 2a and 2b can rotate without being restricted are opposite between the layers La and Lb.

This will be explained with reference to the movable tensegrity structure 1 of FIG. 1. As shown in FIG. 4, for the layer La, the end point E2a on the upper side of each of the rigid members 2a can be rotated in the clockwise direction about the axis C on the front in the diagram, and the end point E2a on the lower side can be rotated in the counterclockwise direction about the axis C on the front in the diagram. For the layer Lb, conversely, the end point E2b on the upper side of each of the rigid members 2b can be rotated in the counterclockwise direction about the axis C on the front in the diagram, and the end point E2b on the lower side can be rotated in the clockwise direction about the axis C on the front in the diagram.

As described above, for the layers La and Lb, the directions in which the rigid members 2a and 2b rotate are different from each other depending on the difference in the combination of the rigid members 2a and 2b. Thus, the twisting direction of the layer La is opposite to that of the layer Lb.

[1-1-2. Tension Member and Contraction-Controllable Member]

The following describes the arrangement of the tension members 3. In this embodiment, the end points E of the tension members 3 are connected to the rigid members 2 arranged as described above, according to the following three methods.

First, for any desired two of the three rigid members 2 belonging to the same layer L, there is a tension member 3 that connects the end point E on the upper side of one rigid member 2 and the end point E on the lower side of another rigid member 2 that passes below the rigid member 2. So the tension member 3 connecting the end points E2a of two rigid members 2 belonging to the same layer L as described above will be called the tension member 3a, and the tension members 3 connecting the end points E2b of two rigid members 2 belonging to the same layer L will be called the tension member 3b.

Second, there is a tension member 3 that connects the end point E of the rigid member 2 belonging to one layer L and the end point E of the rigid members 2 belonging to the layer L which is adjacent to the layer L which is adjacent to this layer L. For example, a tension member 3 is used to connect the end point E2a on the upper side of the rigid member 2a belonging to the one layer La, and the end point E2a on the lower side of the rigid member 2a belonging to the layer La two layers upwardly from the one layer La. Further, a tension member 3 is used to connect the end point E2a on the lower side of the rigid member 2a belonging to the one layer La, and the end point E2a on the upper side of the rigid member 2a belonging to the layer La two layers downward from the one layer La. This tension member 3 is called the tension member 3c.

For the rigid member 2b belonging to the layer Lb as well, a tension member 3 is used to connect the end point E2b thereof and the end point E2b of the rigid member 2b belonging to the layer Lb two layers upward or downward from the layer Lb. This tension member 3 will be called the tension member 3d.

Third, there is a tension member 3 on the boundary portion of two adjacent layers La and Lb connecting the end points E2a and E2b of the rigid members 2a and 2b belonging to these two layers La and Lb, respectively. This tension member 3 will be called the tension member 3e.

In this embodiment, out of the aforementioned three types of tension members 3 (tension members 3a, 3b, tension members 3c, 3d and tension member 3e), two types of tension members 3 are made of contraction-controllable member: One is tension members 3a and 3b and the other is tension members 3c and 3d, both types of which connect the end point E of the upper and lower rigid members 2. In this invention, all or some of the plurality of tension members 3 are made of contraction-controllable members, whereby the movable tensegrity structure is ensured.

The contraction-controllable member of the present embodiment uses a polymer artificial muscle made of a conductive plastic material capable of quick contraction, wherein this artificial muscle provides easy control contraction by application of an electrical current. Further, a pneumatic artificial muscle such as a pneumatic pressure type or McKibben type muscle, a metallic artificial muscle made of biometal and others, and an artificial muscle using a shape memory alloy, for example, can be used as the contraction-controllable member.

In the following description, a contraction-controllable member may be referred to as an artificial muscle for short. The tension members 3a, 3b and the tension members 3c, 3d made of the aforementioned contraction-controllable member may be called the artificial muscles 3a, 3b and artificial muscles 3c, 3d in some cases.

For example, although only a set of tension members 3a, 3b or a set of tension members 3c, 3d can be made of artificial muscles, at least one of the aforementioned two sets is made of artificial muscle. The tension member 3e can be formed of the artificial muscle. Further, the tension member 3 that does not use the artificial muscle can be formed of a wire, for example. Further, as described with reference to the description of conventional arts, such an elastic material as a rubber or spring can be used.

When the artificial muscle 3a connecting the end points E2a of the two rigid members 2a belonging to the same layer La is contracted, contraction occurs in such a way that the artificial muscle 3a of the layer La will be, so to speak, crashed. However, for example, if it is intended to contract the artificial muscle 3c connecting the end point E2a of the rigid member 2a belonging to one layer La, and the end point E2a of the rigid member 2a belonging to one layer La which is adjacent to the layer Lb which is adjacent to the this layer La, contraction occurs in such a way that the artificial muscle 3c of the layer Lb sandwiched between two layers La and La will be crashed.

As described above, both the artificial muscles 3a and 3b are used to connect the end points E2a of the rigid member 2a. Whereas the contraction of the artificial muscle 3a acts on the layer La, the contraction of the artificial muscle 3c acts on the layer Lb. In this sense, these members act on different layers. Thus, in the present embodiment, in order to contract the layer La, the artificial muscles 3a and 3d are actuated. In order to contract the layer Lb, the artificial muscles 3b and 3c are actuated.

As described above, in the present embodiment, the three rigid members 2a belonging to layer La and the three rigid members 2b belonging to layer Lb are arranged to form mirror images of each other. Thus, the direction in which the end point E on the upper side of the rigid member 2b and the end point E on the lower side rotate about the axis C is determined for each layer L, depending on the difference in the combination of three rigid members 2 belonging to each layer L, as shown in FIG. 4. Thus, the directions of torsion on the layer La and layer Lb are opposite to each other.

Accordingly, the artificial muscles 3a, 3d and artificial muscles 3b, 3c are provided at an inclined position with respect to the axis C of the movable tensegrity structure 1 so that the contraction will occur in the direction where the end point E on the upper side of the rigid member 2b of each layer L and the end point E on the lower side can rotate about the axis C, i.e., and so that contraction will occur in the direction on the distortion of the layer L when the contractions of the artificial muscles 3a, 3d and artificial muscles 3b, 3c work on each layer L. Further, since the directions of twist of the layers La and Lb are opposite to each other as described above, the directions of the inclination with respect to the axis C are opposite with each between the artificial muscle 3a, 3d for contracting the layer La, and the artificial muscle 3b, 3c for contracting the layer Lb.

[1-1-3. Relationship Between Rigid Members and Artificial Muscles]

Figure 5A:
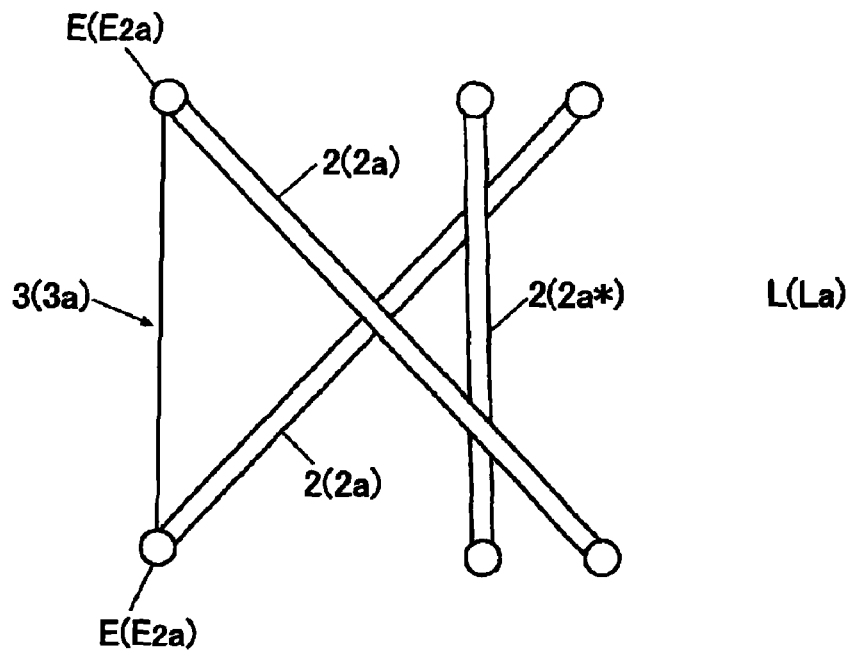
Figure 5B:
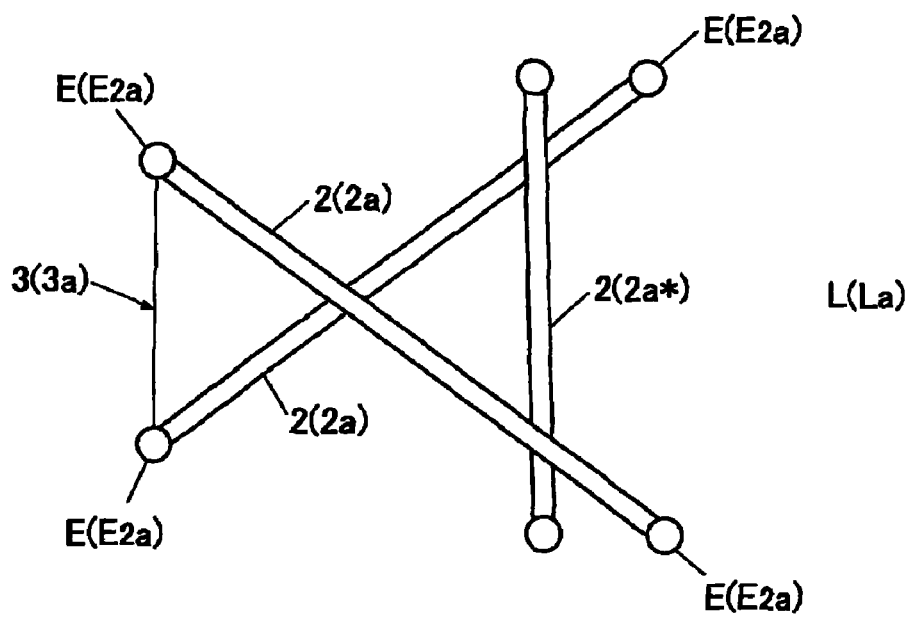
FIG. 5B is a diagram showing that the artificial muscle of FIG. 5A is contracted.
Figure 6A:
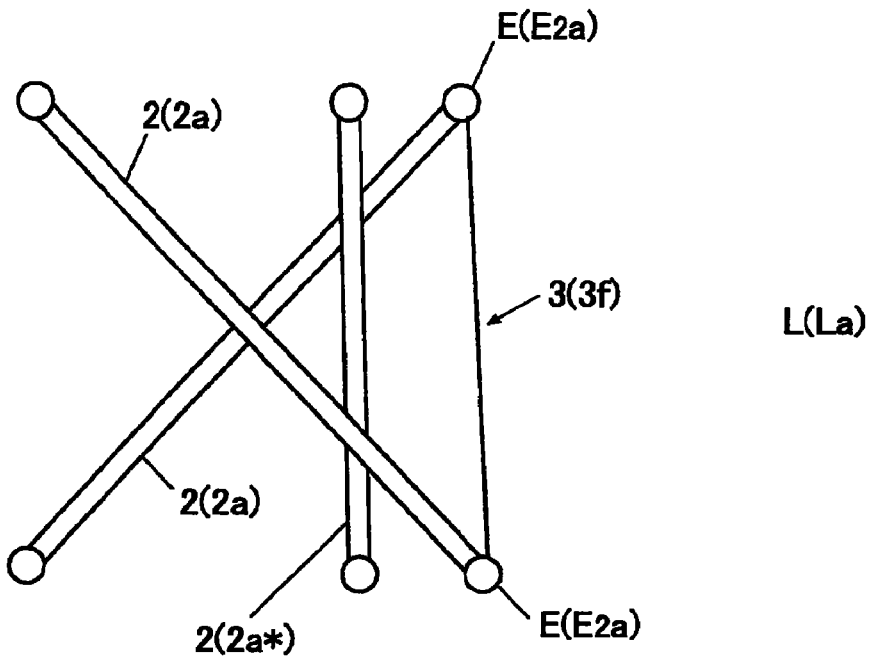
Figure 6B:
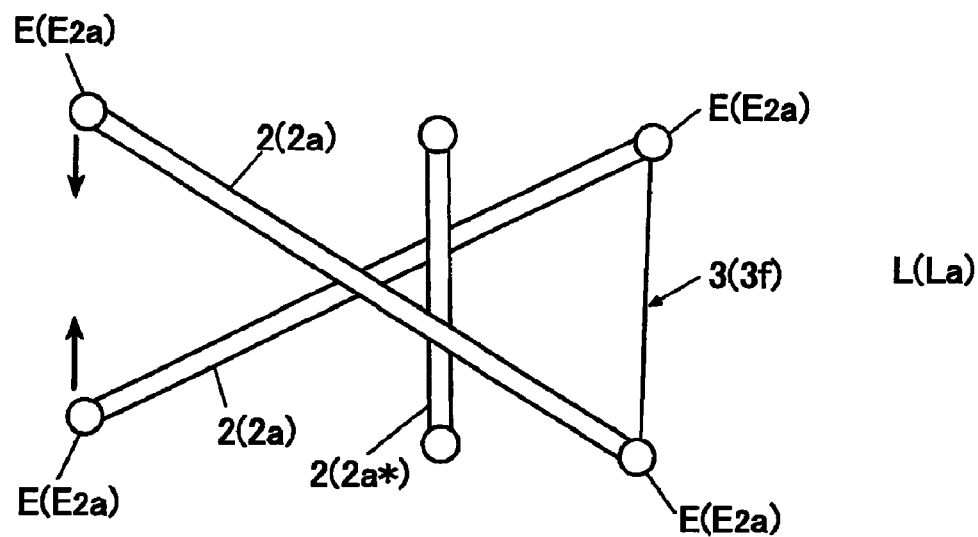
FIG. 6B is an explanatory diagram showing that the artificial muscle of FIG. 6A is contracted.

The following describes the relationship between the rigid members 2 and artificial muscles (tension members) 3: As a result of research efforts, the inventors of the present invention have gained the following knowledge. The following FIGS. 5A and 5B are the front views representing the three rigid members 2a and artificial muscles 3a in the layer La of the present invention. FIGS. 6A and 6B are the front views representing the examples of variations of FIGS. 5A and 5B.

When three rigid members 2 forming each of the layers L are combined as shown in FIGS. 3A and 3B, for example, in the rigid members 2a constituting the layer La, the configuration is designed in such a way that another rigid member 2a passes through the triangle formed of a total of three members, i.e., two rigid members 2a and artificial muscle 3 connecting the end points E2a thereof as shown in FIG. 6A. To be more precise, one rigid members 2a* out of three rigid members 2a forming the layer La is surrounded by a total of three artificial muscles 3f connecting the other two rigid members 2a and the end points E2a thereof by at least one turn.

In this case, if the artificial muscle 3 is contracted, the space interval between the end points E2a of other two rigid members 2a will be reduced, with the result that the rigid member 2a is sandwiched between the other two rigid members 2a. This will cause the rigid member 2a* to work as a fulcrum for the movement of the other two rigid member 2a. This causes reduction in the space interval between the end points E2a on the side, connected by the artificial muscle 3f, of the rigid member 2a, as well as the space interval between the end points E2a on the opposite side, as shown in FIG. 6B. To be more specific, the configuration shown in FIG. 6A causes a reduction in the space interval between the end points E2a on both sides of two rigid members 2a, synchronously with the contraction of the artificial muscle 3.

In the meantime, as in the present embodiment given in FIG. 5A, assume that the rigid members 2a constituting the layer La is constructed in such a way that another rigid member 2a* passes outside the triangle formed by a total of three members, i.e., two rigid members 2a and the artificial muscle 3 connecting end points E2a thereof. To be more precise, assume a configuration where the circumference of one rigid member 2a* out of the three rigid members 2a constituting the layer La is not surrounded by a total of three members, i.e., the other two rigid members 2a and the artificial muscle 3 connecting end points E2a thereof.

In this case, when the artificial muscle 3a is contracted, the rigid member 2a* is not sandwiched between the other two rigid members 2a even if there is a reduction in the space interval between the end points E2a of the other two rigid members 2a. Rather, the other two rigid members 2a move away from the rigid member 2a*. As shown in FIG. 5B, there is a reduction only in the space interval between the end points E2a on the side connected by the artificial muscle 3a of the rigid member 2a*. To be more specific, it has been revealed that, in the configuration of the present invention, there is a reduction only in the space interval between the end points E2a on one side of two rigid member 2a*. The space interval between the end points E2a on the opposite side is kept unchanged.

In the present embodiment, the structure of FIG. 5A is adopted to ensure that there is no reduction in the space interval between the end points E on the side, not connected by the artificial muscle 3, of the rigid member 2, synchronously with the contraction of the artificial muscle 3.

As shown in FIG. 1, in the layer La, one rigid member 2a* is surrounded by a total of five members, i.e., two rigid members 2a, two tension members 3e and one artificial muscle 3c. In this case, if the artificial muscle 3c has contracted, two rigid members 2a exhibits a slight movement in the direction of the rigid members 2a being sandwiched as two rigid members 2a are dragged by the contraction of the artificial muscle 3c. However, this does not cause the rigid members 2a to act as a fulcrum for the movement of these two rigid members 2a. Thus, there is practically no contraction of the artificial muscle 3a on the opposite side.

As shown in FIG. 6A, the space interval between the end points E on both sides of two rigid members 2 does not contract synchronously with the contraction of the artificial muscle 3, except when a structure is adopted to ensure that one rigid members 2 is surrounded by a total of three members, i.e., other two rigid members 2 and one artificial muscle 3 connecting the end points E thereof.

[1-1-4. Other Structures]

The power supply device, cable and control device for supplying power to enable contraction of the artificial muscle 3 are not illustrated in FIGS. 1 through 5. A commonly known power supply device can be used as the aforementioned power supply device if it is capable of supplying a sufficient amount of power to operate the artificial muscle 3. Control can be provided, for example, by programming on a computer or by direct supply of power to the artificial muscle by manual on-off operation of a switch.

For the power cable, it is possible to run a cable through a rod-like rigid member 2 and to connect it with the artificial muscle 3 at the end point E of the rigid member 2 without affecting the bending operation of the movable tensegrity structure 1 to be described later. As shown in FIGS. 3A and 3B, a triangular internal space S is formed around the axis C of the movable tensegrity structure 1 by the three rigid members 2 belonging to each layer L. The cables connected with the artificial muscle 3 can be bundled inside the internal space S around the axis C and can be run through the internal space S, so that the cables are connected with an external power supply device or control device.

1-2. Operation of the Movable Tensegrity Structure

The following describes the operation of the movable tensegrity structure 1.

[1-2-1. Bending Operation of the Movable Tensegrity Structure]

In the present embodiment, as shown in FIG. 5A, each layer L of the movable tensegrity structure 1 is structured to ensure that the circumference of one rigid member 2 (2a*) out of the three rigid members 2 constituting the layer La is not surrounded with a total of three members, i.e., the other two rigid members 2a and a artificial muscle 3 connecting end points E2a thereof.

Thus, in the movable tensegrity structure 1 shown in FIG. 1, even when the artificial muscle 3a shown at the leftmost end of the drawing of the layer La has been contracted, the right-hand portion of the layer La is not contracted synchronously therewith, as described above. Part of the layer La, namely, the left-hand portion of the layer La is contracted in the direction of axis C by the contraction of the artificial muscle 3a so that the axis C of the movable tensegrity structure 1 can be bent.

For example, if the portion below the layer La in FIG. 1 is fixed not to move, the portion of the axis C of the movable tensegrity structure 1 located above the layer La is bent to the left, with respect to the portion below the layer La, and the movable tensegrity structure 1 is bent at the portion of layer L. In this manner, for example, the artificial muscle 3 is contracted, part of one layer L is contracted in the direction of axis C, whereby the axis C of the movable tensegrity structure 1 can be bent.

Figure 7:
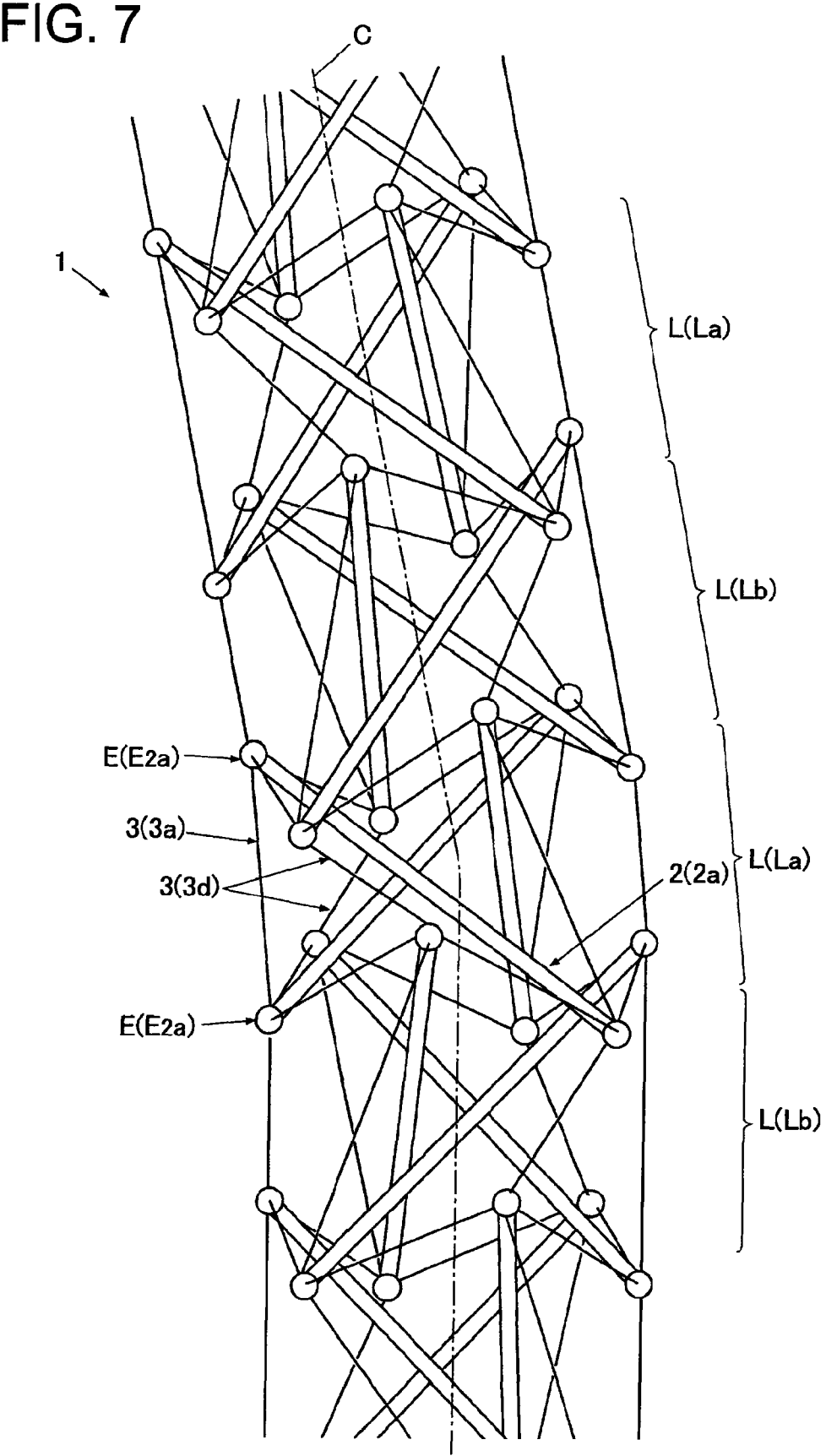
FIG. 7 is a front view showing the movable tensegrity structure which is bent.

In the aforementioned case, only the artificial muscle 3a of the layer La can be contracted. However, if not only the artificial muscle 3a but also the artificial muscle 3d and others located in the layer La in the vicinity of the artificial muscle 3a are contracted to a proper degree, the axis C of the movable tensegrity structure 1 can be bent with greater stability, as shown in FIG. 7. The axis C of the movable tensegrity structure 1 can be bent further in the same direction by further contracting the artificial muscle 3a and others of the layer La, or by contracting or the same position of one or more than one layers La and Lb above or below the layer La, i.e., the artificial muscle 3 on the leftmost portion of the layer L in the example of FIG. 7.

As described above, the artificial muscle 3 is provided at an inclined position with reference to the axis C of the movable tensegrity structure 1 to ensure that the contraction will be applied in the direction wherein the end point E on the upper side of the rigid member 2b of each layer L and the end point E on the lower side can rotate about the axis C. Thus, when the artificial muscle 3a is contracted as described above, the end point E2a on the upper side connected to the artificial muscle 3a and the end point E2a on the lower side exhibit a slight distortion in the direction shown in FIG. 4, at the portion of the artificial muscle 3a of the layer La, i.e., at the leftmost end of the layer La in the example of FIG. 7.

Thus, the movable tensegrity structure 1 may exhibit a slight distortion around the axis C at the portion of the layer La in some cases. When the bending operation of the movable tensegrity structure 1 is performed by contracting the artificial muscle 3 of a plurality of layers L, distortion may occur around the axis C, simultaneously with the bending operation.

Such a distortion can be eliminated by mutual cancellation of the distortions occurring to the layers La and Lb in the opposite direction. This can be achieved, for example, by selecting the number of the layers L that cause bending in such a way that the number of the layers La is the same as that of the layers Lb. This arrangement allows only bending to occur to the movable tensegrity structure 1.

[1-2-2. Contracting Operation of the Movable Tensegrity Structure]

Figure 8:
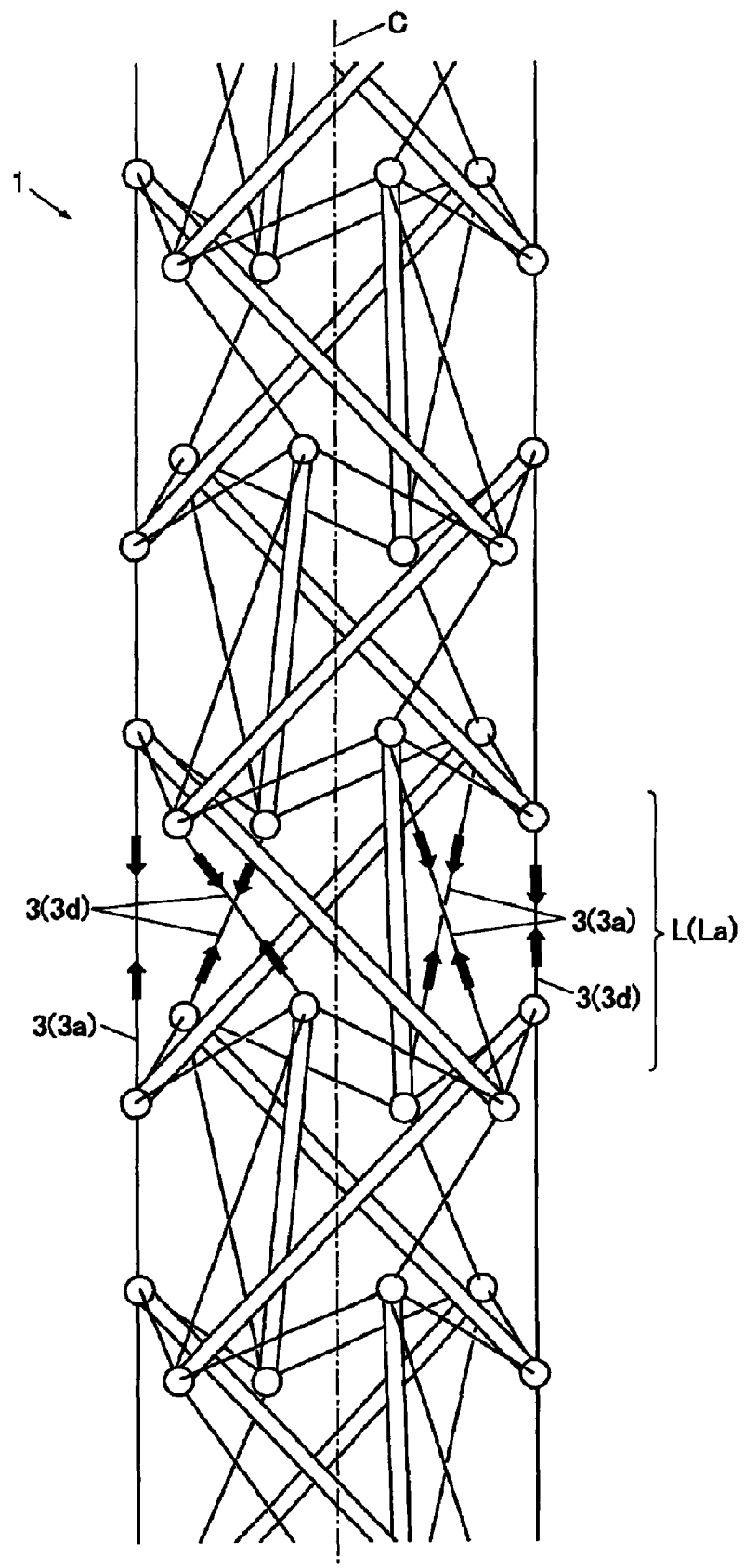
FIG. 8 is an explanatory diagram showing that the artificial muscle is contracted.

When all or part of the artificial muscles 3a, 3d are contracted on the layer La, contraction is applied in such a way that the space interval between the upper and lower sides of the layer La is reduced by the contraction of the artificial muscles 3a, 3d, as shown in FIG. 8. This permits each of the layers L to be contracted in the direction of the axis C, by proper contraction of all or part of the artificial muscles 3a, 3d on the layer La and the artificial muscles 3b, 3c on the layer Lb, without the axis C of the movable tensegrity structure 1 being bent.

If the portion below the layer La to be contracted is fixed not to move, for example, in FIG. 8, the entire portion above the layer La of the movable tensegrity structure 1 is lowered in the direction of the axis C. This permits the entire or partial contraction of the movable tensegrity structure 1 in the direction of the axis C.

In this case, the artificial muscles 3 are installed at an inclined position with respect to the axis C of the movable tensegrity structure 1, as described above. Thus, distortion occurs to each layer L in a peculiar direction. However, the problem can be solved by mutual cancellation of distortions occurring in the opposite directions between the layers La and Lb, for example, if the number of the layers L wherein distortion occurs is selected in such a way that the number of the layers La is the same as that of the layers Lb. This allows contraction to occur only in the direction of the axis C.

In the aforementioned manner, each layer L is extended in the direction of the axis C by eliminating or alleviating the contraction of the artificial muscle 3 of each layer L, whereby the movable tensegrity structure 1 once contracted can be expanded in the direction of the axis C.

[1-2-3. Bending Operation of the Movable Tensegrity Structure]

As described above, if all the artificial muscles 3a, 3d are contracted on the layer La, the layer La can be distorted in the direction shown in FIG. 4 by the contraction of the artificial muscles 3a and 3d, without bending the axis C of the movable tensegrity structure 1, because the artificial muscles 3 are inclined with respect to the axis C of the movable tensegrity structure 1, as shown in FIG. 8.

For example, in FIG. 8, the portion below the layer La to be contracted is fixed not to move. Then the entire portion above the layer La in the movable tensegrity structure 1 is distorted about the axis C. This permits the entire and partial contraction of the movable tensegrity structure 1 in the direction of the axis C. This description also applies to the case of the layer Lb. Since the artificial muscles 3b, 3c are inclined in the direction opposite to that in the case of the layer La, distortion occurs in the direction reverse to that for the layer La.

A plurality of only the layers La or a plurality of only the layers Lb are selected, and the artificial muscle 3 of each layer L is contracted, so that distortion occurs to reach layer L. This allows the movable tensegrity structure 1 to be distorted heavily about the axis C in the direction peculiar to each layer.

In the twisting operation, all of the artificial muscles 3; 3d of the layer La and the artificial muscles 3b, 3c of the layer Lb are contracted. This is necessarily accompanied by contraction, as described above. However, for example, the artificial muscle 3 of each layer L is contracted to some extent in advance, and the layers L other than the layer L wherein distortion occurs are simultaneously expanded, in response to the degree of the contraction of the layer L wherein twisting operation occurs. This arrangement allows the movable tensegrity structure 1 to be free from contraction as a whole, while distortion is allowed to occur at required positions.

[1-2-4. Other Operations of the Movable Tensegrity Structure]

Complicated operations of the movable tensegrity structure 1 can be provided by a combination of the aforementioned bending operation, twisting operation and contraction-extension operation, although details are not described here.

In the aforementioned contraction (extension) operation, it has been demonstrated that, for example, the number of the layers L for causing the bending and contraction (extension) operation is selected in such a way that the number of the layer La is the same as that of the layer Lb, whereby simultaneously occurrence of twisting operation is prevented. It is also possible to permit simultaneous occurrence of the bending operation, contraction (extension) operation and twisting operation by selecting the numbers and places of the layers La and Lb in such a way that there will be no mutual cancellation of the distortions of layers L at the time of contraction (extension) operation. Further, the operation of the movable tensegrity structure 1 can be controlled in such a way that the bending and contraction (extension) operations are performed at the same time.

1-3. Effects of the Movable Tensegrity Structure

According to the movable tensegrity structure 1 of the present embodiment described above, contraction-controllable members (artificial muscle) are used to form all or part of a plurality of tension members 3 connecting the end points E of the rigid members 2 constituting the tensegrity structure. This arrangement ensures the tensegrity structure to be formed into a movable structure. Further, contraction of the tension members 3 as contraction-controllable members permits the movable tensegrity structure 1 to perform bending operation, twisting operation and contracting operation.

When the configuration is designed in such a way that the circumference of the rigid member 2 will not be surrounded by a total of three members, i.e., the other two rigid members 2 and tension member 3 connecting the end points E of these two rigid members 2, and the tension member 3 is made of a contraction-controllable member (artificial muscle), the rigid member 2 provides the function of a fulcrum for the movement of the other two rigid members 2, and makes it possible to eliminate the possibility of the other portions of the movable tensegrity structure 1 being contracted when the tension member 3 as a contraction-controllable member is contracted.

Thus, when a plurality of portions are contracted by the contraction of a single tension member 3 as a contraction-controllable member as described above, the control structure for the operation of the movable tensegrity structure 1 is complicated. However, easy control of the movable tensegrity structure 1 is ensured if the configuration is designed in such a way that only the portion of the tension member 3 is allowed to be contracted when the tension member 3 as a contraction-controllable member is contracted, as in the case of the present embodiment. This provides a simple control structure.

When the movable tensegrity structure 1 is formed by stacking the layers L formed with a combination of a predetermined number of rigid members 2 (three rigid members 2 for the present embodiment), in the direction of the axis C, the bending operation can be performed by allowing only the portion of the tension member 3 to be contracted by the contraction of the tension member 3 as a contraction-controllable member.

2. Second Embodiment

The movable tensegrity structure 1 as the aforementioned first embodiment has been explained with reference to the case where one layer L is formed of three rigid members 2 as one set. With reference to the present embodiment, the following describes the movable tensegrity structure 1* having an increased number of the rigid members 2 belonging to the layer L.

A basic structure of the movable tensegrity structure 1* in the present embodiment is the same as that of the movable tensegrity structure 1 in the aforementioned first embodiment. The members having the functions similar to those of the members of the movable tensegrity structure 1 will be assigned the same reference numerals in the following description.

Figure 9:
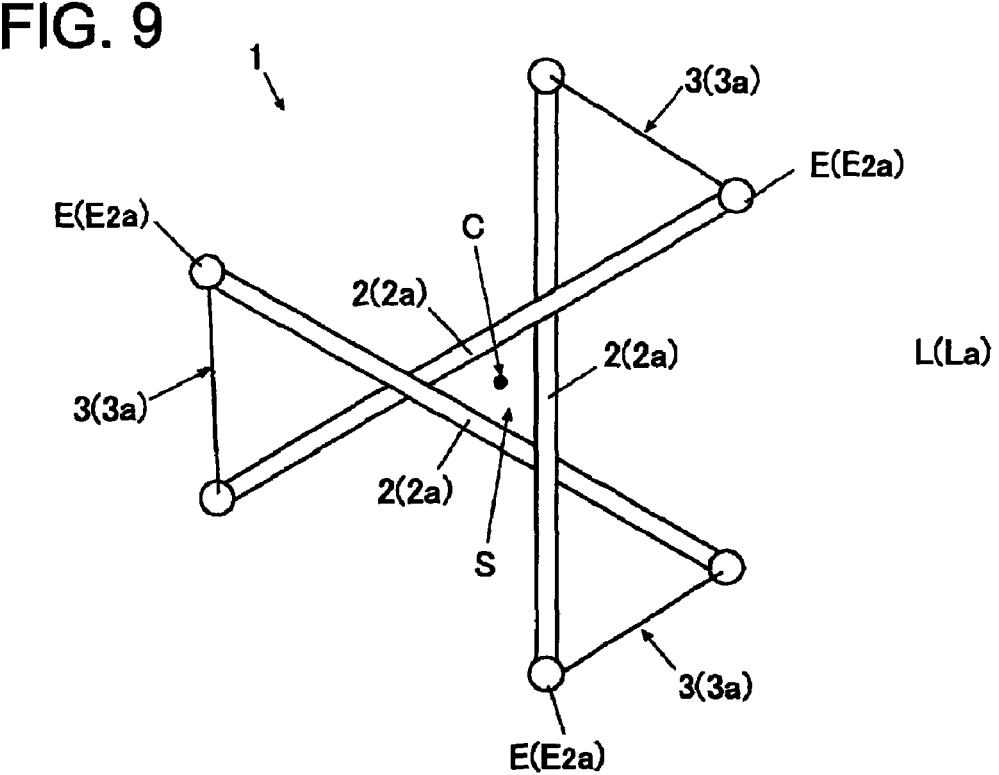
FIG. 9 is a plan view showing the rigid member artificial muscle axis and an internal space in the movable tensegrity structure of FIG. 1.

The plan view of FIG. 9 shows the artificial muscle 3 added to FIG. 3A showing three rigid members 2a belonging to the layer La as viewed from top. This shows the structure of the movable tensegrity structure 1 in the aforementioned first embodiment. With this basic structure kept unchanged, the number of the rigid members 2a belonging to the layer La is increased to four and six, and the artificial muscle 3a is illustrated. Then the movable tensegrity structure 1* will be as illustrated in FIGS. 10 and 11.

In this case, for the layer La, the direction of distortion is depends on how the rigid members 2 belonging to each layer La are combined. Thus, similarly to the case of three rigid members 2a shown in FIG. 9, the end points E2a of the rigid member 2a are connected in such a way so that the direction of the artificial muscle 3a connecting the end points E2a (end point on the front side of drawing) on the upper side of the rigid member 2a and the end points E2a on the lower side of the rigid member 2a will be constant when four and six rigid members 2a are used as shown in FIGS. 10 and 11.

Figure 10:
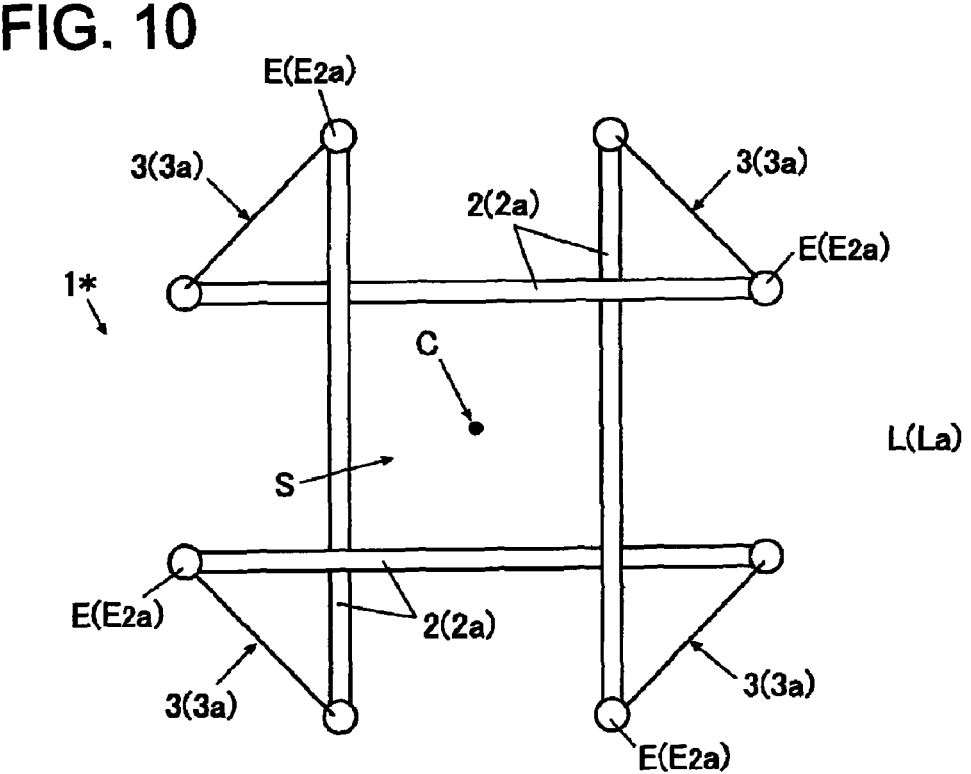
FIG. 10 is a plan view showing the internal space when the number of the rigid members is assumed as four.
Figure 11:
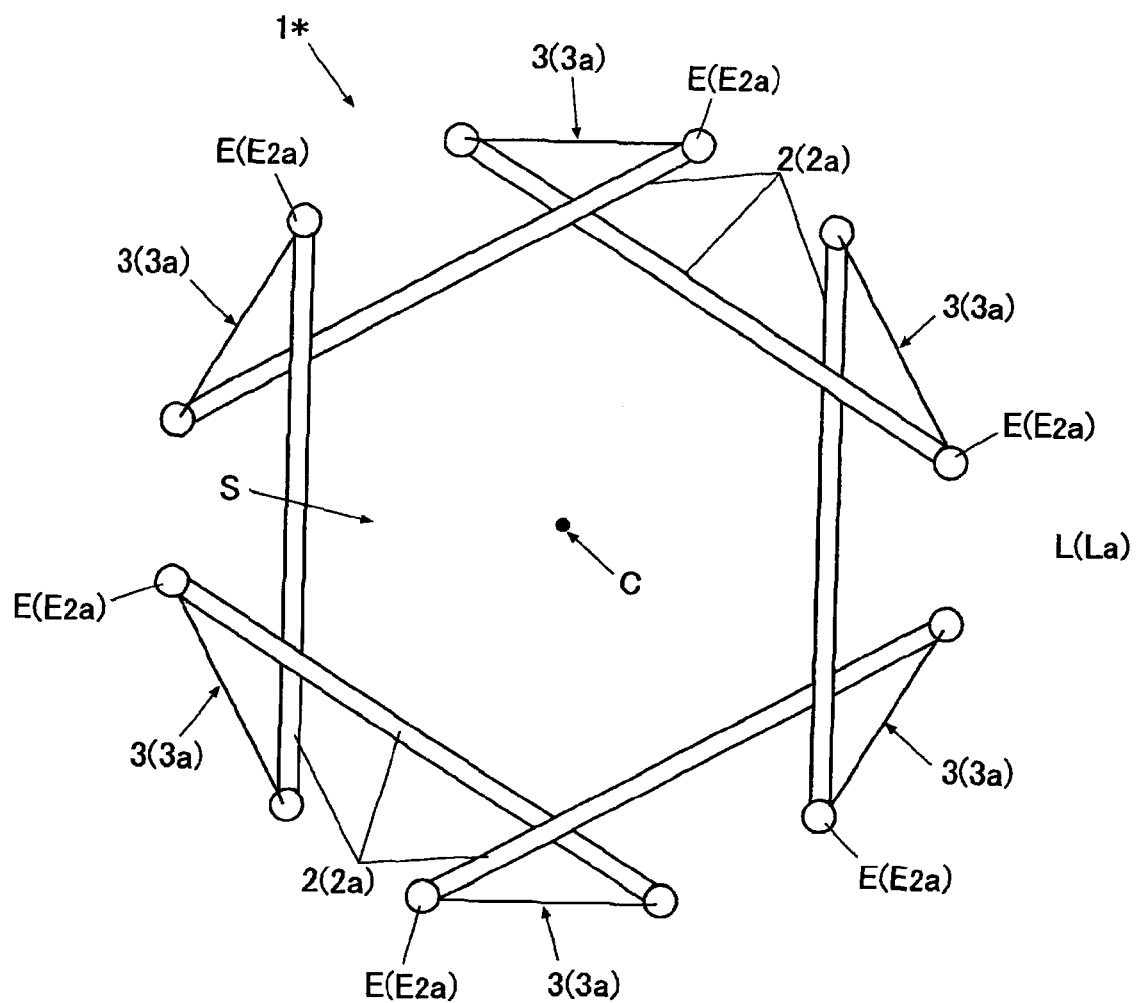
FIG. 11 is a plan view showing the internal space when the number of the rigid members is assumed as six.

It can be seen that, as the number of the rigid members 2 belonging to the layer L is increased, the internal space formed around the axis C of the movable tensegrity structure 1* is increased by a predetermined number of rigid members 2 belonging to the layer L, as shown in FIGS. 9 through 11. It can also be seen that the movable tensegrity structure 1* formed by such layers L being stacked toward the axis C becomes cylindrical as the internal space S of the layer L is increased.

The rigid member 2 constituting the layer L is designed in a smaller configuration and the number thereof is increased so that the thickness of the layer L in the direction of the axis C is reduced. Then the movable tensegrity structure 1* turns into a thin-walled cylindrical body as shown in the front view of the FIG. 12A.

In this case, as shown in the FIG. 12B, as an enlarged view of the portion shown by a circle A in the FIG. 12A, layers La and Lb are alternately stacked in conformity to the basic structure of the movable tensegrity structure 1, and the rigid members 2a, 2b, artificial muscles 3a, 3b, 3c, 3d and tension member 3c are combined, whereby the movable tensegrity structure 1* is formed. The tension member 3e can be made of an artificial muscle, similarly to the case of the first embodiment.

FIGS. 9 through 11 show that the internal space S around the axis C of the movable tensegrity structure 1* is formed in a regular polyhedron form. FIGS. 12A and 12B show that the movable tensegrity structure 1* is formed in a cylindrical shape. Their shape is not always restricted thereto. For example, the movable tensegrity structure 1* of FIG. 12A can be formed to have an elliptical cross section or other cylindrical cross sections.

As described above, the movable tensegrity structure 1* of the present embodiment is structured in conformity to the basic structure of the first embodiment. This provides the same advantage as that of the movable tensegrity structure 1 of the first embodiment.

Further, as shown in FIGS. 12A and 12B, the rigid members 2 constituting the layer L are designed in a smaller structure and the number thereof is increased so that the thickness in the direction of axis C is reduced. This arrangement allows the movable tensegrity structure 1* of the present embodiment to be formed in a thin-walled cylindrical shape. The movable tensegrity structure 1* is allowed to perform smoother and more flexible bending operation, twisting operation and contracting operation by making the members constituting the movable tensegrity structure 1* smaller in size in the aforementioned manner.

Further, a human body or the like is inserted into the movable tensegrity structure 1* in such a way that a person wears the movable tensegrity structure 1*, which can then be used as a human movement supporting device (power assist device).

When the movable tensegrity structure 1* of the present embodiment is used as a human movement supporting device, the size of the rigid member 2 and others constituting the layer L of FIGS. 12A and 12B is minimized, and the movable tensegrity structure 1* is formed like a supporter or stocking. This ensures the movable tensegrity structure 1* (human movement supporting device) to be put on comfortably and smoothly as if a real supporter or stocking were put on, without the human body being irritated by the rigid member 2 stuck in the human body. Further, the aforementioned advantages are provided by operating the movable tensegrity structure 1* worn as a supporter or stocking. The user's body is subjected to a bending movement and the like. Thus, the user's movement can be assisted and reinforced by the movable tensegrity structure 1*.

3. Third Embodiment

3-1. Configuration of the Movable Tensegrity Structure

FIG. 13 shows the simplest structure of the movable tensegrity structure 10 as a third embodiment of the present invention. As shown in FIG. 13, the movable tensegrity structure 10 of the present embodiment is formed of a combination of a plurality of rigid members 11, and a plurality of tension members 12 connecting the end points E of the rigid members 11.

Figure 14:
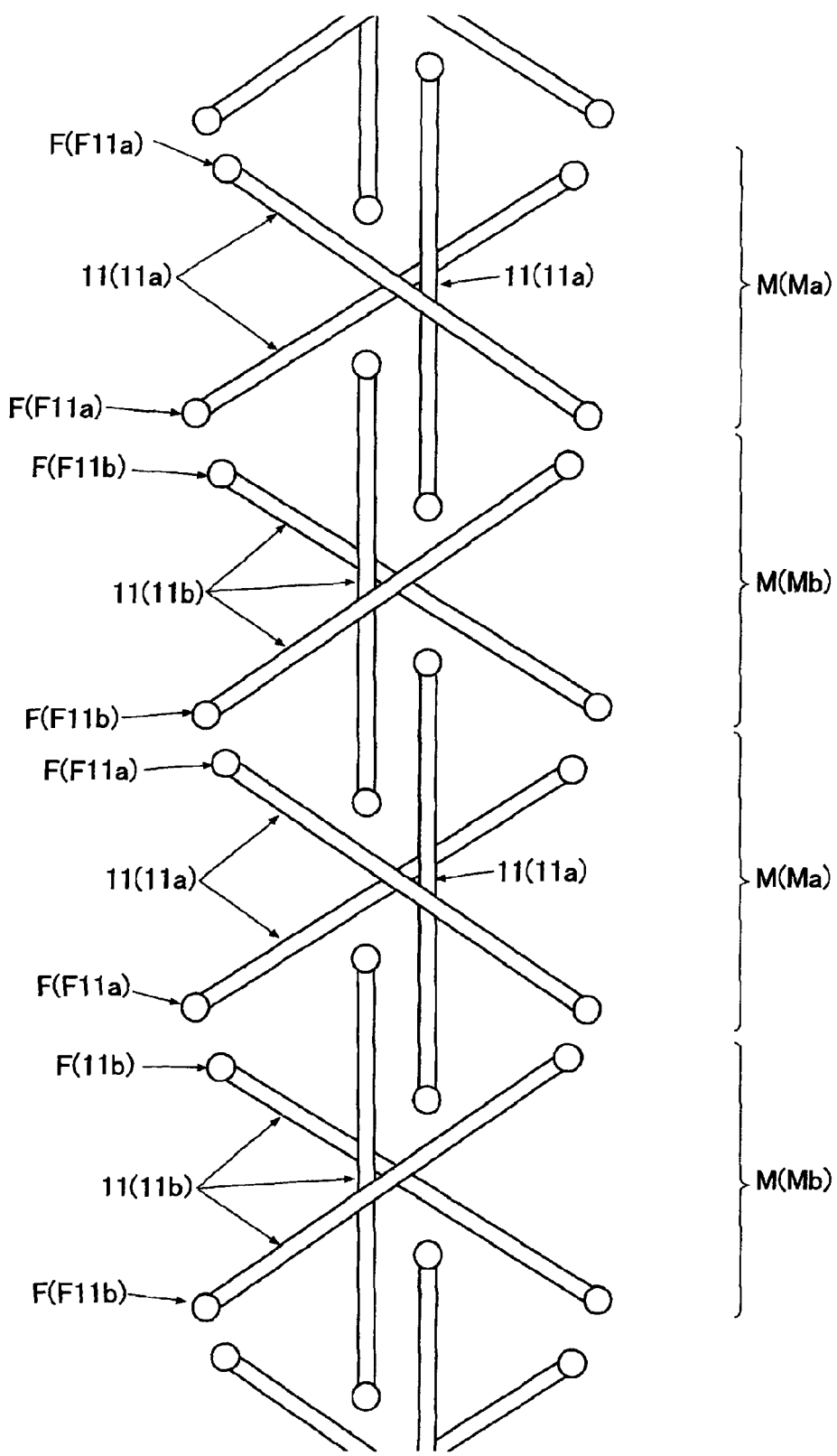
FIG. 14 is a diagram representing only the rigid member of the movable tensegrity structure of FIG. 13.

If the movable tensegrity structure 10 is viewed directly from the front, the tension members 12e will be seen overlapped with each other, and this will be hard to be recognized. FIG. 13 is the front view where the tension members 12c are viewed from a somewhat upper position so that the tension members 12c will not be overlapped with each other FIG. 14 shows only the rigid members 11 of FIG. 13.

[3-1-1. Rigid Member]

In this embodiment, the structure of the rigid member 11 itself and the combination of rigid members 11 are the same as those of the rigid members 2 in the first embodiment. This embodiment is also the same as the first one in that the movable tensegrity structure 10 is configured in such a way that the layers M each formed of a set of three rigid members 11 are stacked one after another along a single axis D.

Assume that layers Ma and Mb represent two mutually adjacent layers, and rigid members 11a and 11b indicate the rigid members 11 belonging to the layers Ma and Mb, respectively. When the rigid members 11a and 11b in the layers Ma and Mb are viewed from the top, these members are the same as those shown in FIGS. 3A and 3B. The layers L, La, Lb, rigid members 2, 2; 2b and end points E, E2a, E2b in FIGS. 3A and 3B correspond to the layers M, Ma, Mb, rigid members 11, 11a, 11b and end points F, F2a, F2b in FIGS. 3A and 3B, respectively.

As described above, in the present embodiment as well, three rigid members 11a belonging to the layer Ma and three rigid members 11b belonging to the layer Mb are arranged to form mirror images of each other. The directions where the rigid members 11a, 11b are allowed to freely rotate are opposite to each other for layers Ma and Mb.

Figure 15:
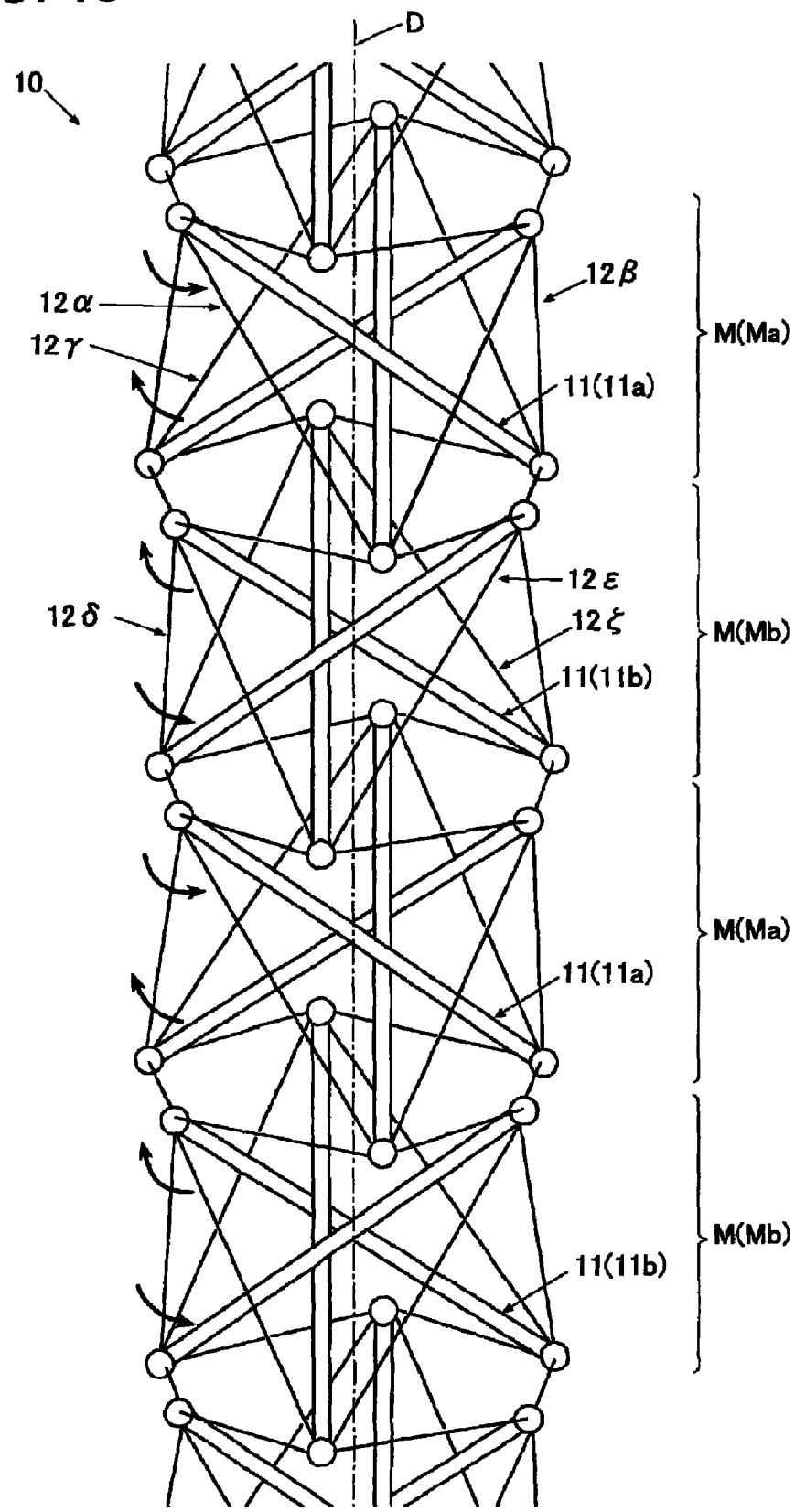
FIG. 15 is a front view showing the twisting direction in each layer of the movable tensegrity structure of FIG. 13.

Thus, as shown in FIG. 15, for the layer Ma, the end point F11a on the upper side of each of the rigid members 11a can be rotated in the clockwise direction about the axis D on the front side of the diagram, and the end point F2a on the lower side can be rotated in the counterclockwise direction about the axis D on the front side of the diagram. For the layer Mb, conversely, the end point F11b on the upper side of each of the rigid members 11b can be rotated in the counterclockwise direction about the axis C on the front side of the diagram, and the end point F2b on the lower side can be rotated in the clockwise direction about the axis D on the front side of the diagram.

As described above, for the layers Ma and Mb, the directions in which the rigid members 11a and 11b rotate are different from each other depending on the difference in the combination of the rigid members 11a and 11b. Thus, the twisting direction of the layer Ma is opposite to that of the layer Mb.

[3-1-2. Tension Member and Contraction-Controllable Members]

In this embodiment, the arrangement of the tension member 12 is different from that in the first embodiment.

In the present embodiment, the tension member 12 is located on the boundary between the mutually adjacent layers Ma, Mb, and there is a tension member 11e connecting the end points F11a of the rigid members 11a, 11b belonging to these two layers Ma, Mb. This is the same as the tension member 3e of the first embodiment. In the present embodiment, such an elastic material as a rubber or spring can also be used as the tension member 11e. An artificial muscle (contraction-controllable member) can also be used as the tension member 11c.

Unlike the case of the tension members 3c, 3d of the first embodiment, there is no tension material in the present embodiment that connects the end points F of the rigid members 11 belonging to the layer M, and the end points F of the rigid members 11 belonging to the layer M upwardly or downwardly adjacent to the layer M further upwardly or downwardly adjacent to the layer.

For the three rigid members 11 belonging to the same layer M, a total of six tension members 12 are used to connect the end points F on the upper side of each rigid member 11 and the end points F on the lower side of the other two rigid members 11. In the present embodiment, a contraction-controllable member (artificial muscle) is used to connect the end points F on the upper and lower sides of the three rigid members 11 belonging to the same layer M. The same contraction-controllable member used in the first in the present embodiment can be used.

[3-1-3. Relationship Between Rigid Member and Artificial Muscles]

In the present embodiment, the end points F of three rigid members 11 belonging to the same layer M connected by a total of six tension members 12, i.e., artificial muscles 12 as contraction-controllable members in the aforementioned manner.

Thus, similarly to the relationship shown in FIG. 5A with reference to the first embodiment, there are three artificial muscles 12 for each layer M, these artificial muscles 12 being structured in such a way that one of three rigid members 11 constituting the layer M is not surrounded with a total of three artificial muscles 12 connecting the other two rigid members 11 and the end points F thereof. In the following description, such an artificial muscle 12 will be referred to as a artificial muscle 12a or 12b.

In addition, similarly to the relationship shown in FIG. 6A with reference to the first embodiment, one of three rigid members 11 constituting the layer M is surrounded with a total of three artificial muscles 12 connecting the other two rigid members 11 and the end points F thereof. There are three artificial muscles 12 for each layer M, as well. Such an artificial muscle 12 will be called an artificial muscle 12f in the following description.

As shown in FIG. 13, three mutually adjacent artificial muscles constitute artificial muscles 12a or 12b inside the same layer M, and the remaining three mutually adjacent artificial muscles constitute artificial muscles 12f. For the layer Ma, three mutually adjacent artificial muscles on the left side of the drawing are artificial muscles 12a, and three mutually adjacent artificial muscles on the right side of the drawing are artificial muscles 12f. For the layer Mb, in contrast, three mutually adjacent artificial muscles on the right side of the drawing are artificial muscles 12b, and three mutually adjacent artificial muscles on the left side of the drawing are artificial muscles 12f. As described above, an opposite relationship is found between the position where the artificial muscles 12a are eccentrically located inside the layer Ma, and the position where the artificial muscles 12b are eccentrically located inside the layer Mb. The same relationship is found with respect to the positions where the artificial muscles 12f are eccentrically located.

Similarly to the case shown in FIGS. 5A and 5B in the first embodiment, the rigid member 11 whose end point F is not connected to artificial muscles 12a, 12b does not work as a fulcrum with respect to the other two rigid members 11. Thus, the space interval between the end points F on the opposite side of the other two rigid members 11 is not reduced, even when the artificial muscles 12a, 12b have been contracted.

Similarly to the case shown in FIGS. 6A and 6B with respect to the first embodiment, the rigid member 11 whose end point F is not connected to the artificial muscle 12f works as a fulcrum with respect to the other two rigid members 11. Thus, if the artificial muscle 12f is contracted, the space interval between the end points F on the opposite side of the other two rigid members 11 is reduced synchronously with the contraction of the artificial muscle 12f.

[3-1-4. Other Structures]

The power supply device, wiring and control device are the same as those of the first embodiment, and will not be described.

3-2. Operations of Movable Tensegrity Structure

The following describes the operations of movable tensegrity structure 10 of the present embodiment:

[3-2-1. Bending Operations of Movable Tensegrity Structure]

In the present embodiment, as described above, the space interval between the end points F on the opposite side of the two rigid members 11 is not reduced even when the artificial muscle 12a inside the layer Ma and the artificial muscle 12b inside the layer Mb are contracted. Further, the position inside the layer Ma where the artificial muscles 12a are eccentrically located is opposite to the position inside the layer Mb where the artificial muscles 12b are eccentrically located. Thus, when the artificial muscle 12a is contracted, the left portion of the layer Ma of FIG. 13 contracts along the axis D. If the artificial muscle 12b is contracted, the right portion of the layer Ma contracts along the axis D.

Taking advantage of the aforementioned properties, one through three artificial muscles 12a are contracted in one or more than one layers Ma. This arrangement allows the axis D of the movable tensegrity structure 10 to be bent to the left, similarly to the case of FIG. 7 with reference to the first embodiment, although this is not illustrated. In this case, if only the artificial muscle 12a at the leftmost position in the layer Ma of FIG. 13 or the artificial muscle 12a located on the furthest point is contracted, the rigid members 11a may collide with each other. To avoid this, it is preferred that the artificial muscle 12a on the front side of the drawing should be contracted.

Similarly, if one through three artificial muscles 12b are contracted in one or more layers Mb, the axis D of the movable tensegrity structure 10 is allowed to be bent to the left. In this case as well, if only the artificial muscle 12b at the rightmost position in the layer Mb of FIG. 13 or the artificial muscle 12b located on the furthest point is contracted, the rigid members 11b may collide with each other. To avoid this, it is preferred that the artificial muscle 12b on the front side of the drawing should be contracted.

[3-2-2. Contracting Operation of Movable Tensegrity Structure]

In the contracting operation of movable tensegrity structure, if all or part of the artificial muscles 12a, 12b, 12f of each of the layers Ma, Mb are contracted, each of the layers M is allowed to be contacted along the axis D, without the axis D of the movable tensegrity structure 10 being bent. This allows all or part of the movable tensegrity structure 10 to be contracted along the axis D.

The movable tensegrity structure 10 contracted in the manner described above can be extended along the axis D by eliminating or alleviating the contraction of the artificial muscle 3 of each layer M and extending the artificial muscle 3 along the axis D.

In this case, the artificial muscle 12 of each layer M is installed at a position inclined in a predetermined direction with respect to each axis D. If the movable tensegrity structure 10 is to be only contracted (extended), it is preferred that the artificial muscles 12a, 12b and 12f should be uniformly contracted (extended) to avoid possible distortion of each layer M. If the artificial muscle 12f alone is contracted (or extended), each layer M can be contracted (or extended), without each layer M being distorted. This allows the movable tensegrity structure 10 to be contracted (or extended), without being distorted.

[3-2-3. Twisting Operation of Movable Tensegrity Structure]

As shown in FIG. 15, in the movable tensegrity structure 10 of the present embodiment, the directions of distortion for layers Ma, Mb depend on how the rigid members 11a, 11b are combined. The directions of distortion for layers Ma, Mb are opposite to each other.

Distortion in the direction of distortion for each layer M can be implemented, for the layer Ma, by contacting the artificial muscles $12\alpha$, $12\beta$, $12\gamma$ that allows the layer Ma to be distorted in the direction of distortion, and, for the layer Mb, by contracting the artificial muscles $12\sigma$, $12\epsilon$, $12\xi$ that allows the layer Mb to be distorted in the direction of distortion, as shown in FIG. 15. This operation is performed for a plurality of layers Ma or Mb, whereby the movable tensegrity structure 10 is allowed to perform a predetermined twisting operation around the axis D.

For the layers Ma, Mb, if the artificial muscles other than artificial muscles $12\alpha$, $12\beta$, $12\gamma$, $12\sigma$, $12\epsilon$, $12\xi$ are contracted, the rigid members 11a or 11b collide with each other. This will fail to twist each layer L, and will fail to ensure the movable tensegrity structure 10 to perform twisting operation about the axis D.

This twisting operation is necessarily accompanied by the contracting operation of the layer Ma and layer Mb along the axis D. For example, the artificial muscle 12 of each layer M is contracted to some extent in advance and the layers M other than the layer M which is subjected to twisting operation is extended in response to the degree of contraction of the layer M which is subjected to twisting operation, whereby the movable tensegrity structure 10 is allowed not to be contracted as a whole, although it is subjected to twisting operation at required positions.

[3-2-4. Other Operations of Movable Tensegrity Structure]

Although detailed description will be omitted, the movable tensegrity structure 1 is allowed to perform a complicated operation by a proper combination of the aforementioned bending operation, twisting operation and contraction/contracting operation, similarly to the case of the first embodiment.

3-3. Advantages of Movable Tensegrity Structure

As described above, in the movable tensegrity structure 10 of the present embodiment, similarly to the case of the first embodiment, all or part of a plurality of artificial muscles 12 connecting the end points F of the rigid members 11 constituting the tensegrity structure are made of contraction-controllable members (artificial muscle), whereby the tensegrity structure can be configured to be a movable tensegrity structure. Further; the movable tensegrity structure 10 is allowed to perform the bending operation, twisting operation and contracting operation by contracting the tension member 12 having been considered as the contraction-controllable member.

When other rigid members 11 are not surrounded with a total of three members, i.e., at least two rigid members 11, and a tension member 12 connecting the end points F of these two rigid members 11, the tension member 12 of that portion is formed of a contraction-controllable member (artificial muscle). This arrangement can eliminate a reduction in the space interval between the end points F on the opposite side of the two rigid members 11, even if the tension member 12 made of a contraction-controllable member is contracted. This provides the same advantage as that of the first embodiment.

In the present embodiment as well, similarly to the case of the second embodiment, it is possible to increase the number of the rigid members 11 belonging to the layer M and to combine these members, thereby forming an internal space around the axis D of the movable tensegrity structure 10. Similarly to the case of the movable tensegrity structure 1* of FIG. 12, if the movable tensegrity structure 10 is shaped in a thin-walled cylindrical form, the movable tensegrity structure 10 is allowed to perform smoother and more flexible bending operation, twisting operation and contracting operation.

The aforementioned first through third embodiments described the rigid member 2 and rigid member 11 made of rod-like members having the same length and diameter. However, if the advantages of the present invention can be demonstrated, the rigid member 2 and rigid member 11 need not always be made of rod-like members having the same length and diameter. The same applies to the tension members and artificial muscle as well.

The invention claimed is:

1. A movable tensegrity structure having a tubular and cylindrical shape, the tensegrity structure comprising:
   a plurality of rigid members; and
   a plurality of tension members each connecting an end of one of the plurality of rigid members and an end of another of the plurality of rigid members, the plurality of rigid members and the plurality of tension members constituting the tubular and cylindrical shape of the tensegrity structure,
   wherein the tensegrity structure does not include a rigid member extending through the tubular and cylindrical shape in an internal space formed by the tubular and cylindrical shape,
   wherein a whole or a part of the plurality of tension members are made up of a contraction-controllable member, and
   wherein the tensegrity structure is bendable by contraction of the contraction-controllable member while maintaining the cylindrical shape.

2. The movable tensegrity structure of claim 1, wherein each of the plurality of rigid members is not surrounded by three members which are two other of the plurality of rigid members and one of the plurality of tension members connecting ends of the two other of the plurality of rigid members, and the one of the plurality of tension members in the three members is made up of the contraction-controllable member.

3. The movable tensegrity structure of claim 1, wherein three members which are two of the plurality of rigid members and one of the plurality of tension members connecting ends of the two of the plurality of rigid members do not surround other of the plurality of rigid members, and the one of the plurality of tension members in the three members is made up of the contraction-controllable member.

4. The movable tensegrity structure of claim 1, wherein the plurality of rigid members constitute a plurality of layers each of which is made up of a combination of a predetermined number of rigid members, and the plurality of layers are stacked in an axis direction.

5. The movable tensegrity structure of claim 4, wherein the predetermined number of rigid members of each of the plurality of layers are combined so as to make an internal space around the axis.

6. The movable tensegrity structure of claim 4, wherein adjacent two layers each have arrangements of the predetermined number of rigid members, and the arrangements of the adjacent two layers are in a mirror image relationship with each other.

7. The movable tensegrity structure of claim 4, wherein one of the plurality of tension members connects at least ends of rigid members belonging to a same layer of the plurality of layers.

8. The movable tensegrity structure of claim 4, wherein one of the plurality of tension members connects an end of a rigid member belonging to one of the plurality of layers and an end of a rigid member belonging to a layer which is adjacent to a layer which is adjacent to the one of the plurality of layers.

9. The movable tensegrity structure of claim 7, wherein one of the plurality of tension members connects ends of rigid members each of which exists in each boundary portion of adjacent two of the plurality of layers.

10. The movable tensegrity structure of claim 7, wherein one of the tension members which connects the ends of the rigid members is made up of a contraction-controllable member.

11. The movable tensegrity structure of claim 4, wherein the plurality of tension members made up of the contraction-controllable member are arranged to be inclined with respect to the axis direction.

12. The movable tensegrity structure of claim 1, wherein the contraction-controllable member is made up of polymer artificial muscle.

13. The movable tensegrity structure of claim 4, wherein the tensegrity structure is configured so that a part of one of the plurality of layers is contracted in the axis direction so as to bend the axis, by contracting the contraction-controllable member.

14. The movable tensegrity structure of claim 4, wherein the tensegrity structure is configured so that a whole of one of the plurality of layers is contracted in the axis direction, so as to twist the tensegrity structure about the axis, by contracting the contraction-controllable member.

15. The movable tensegrity structure of claim 4, wherein the tensegrity structure is configured so that the plurality of layers are contracted in the axis direction, so as to contract the tensegrity structure in the axis direction, by contracting the contraction-controllable member.

16. The movable tensegrity structure of claim 1, wherein the contraction-controllable member is contracted by application of an electric current.

17. A movable tensegrity structure having a tubular and cylindrical shape, the tensegrity structure comprising:
    a plurality of rigid members; and
    a plurality of tension members each connecting only two ends which are an end of one of the plurality of rigid members and an end of another of the plurality of rigid members, at least a part of the plurality of tension members being contraction-controllable,
    wherein the tensegrity structure does not include a rigid member extending through the tubular and cylindrical shape in an internal space formed by the tubular and cylindrical shape, and
    wherein the tensegrity structure is bendable by contracting a part or a whole of the contraction-controllable tension members while maintaining the cylindrical shape.

* * * * *